(12) United States Patent
Seeber

(10) Patent No.: US 7,499,590 B2
(45) Date of Patent: *Mar. 3, 2009

(54) SYSTEM AND METHOD FOR COMPILING IMAGES FROM A DATABASE AND COMPARING THE COMPILED IMAGES WITH KNOWN IMAGES

(75) Inventor: René Seeber, Espenau (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/585,668

(22) Filed: Oct. 24, 2006

(65) Prior Publication Data

US 2007/0127823 A1 Jun. 7, 2007

Related U.S. Application Data

(63) Continuation of application No. 09/746,453, filed on Dec. 21, 2000, now Pat. No. 7,130,466.

(51) Int. Cl.
*G06K 9/68* (2006.01)
(52) U.S. Cl. .................. 382/218; 382/103; 382/190; 382/305; 707/2; 707/3; 707/6; 707/104.1
(58) Field of Classification Search .............. 382/103, 382/190, 218, 305; 705/26; 707/2, 104.1, 707/E17.023, E17.026, 3, 6
See application file for complete search history.

(56) References Cited

U.S. PATENT DOCUMENTS 4,223,380 A 9/1980 Antonaccio et al.
4,400,769 A 8/1983 Kaneda et al.
4,672,609 A 6/1987 Humphrey et al.
4,773,028 A 9/1988 Tallman
4,819,234 A 4/1989 Huber
4,975,950 A 12/1990 Lentz
5,032,979 A 7/1991 Hecht et al.
5,121,345 A 6/1992 Lentz
5,204,966 A 4/1993 Wittenberg et al.

(Continued)

FOREIGN PATENT DOCUMENTS

EP 0 636 977 5/2001

(Continued)

OTHER PUBLICATIONS

Essex, David, E-Sleuths Make Net Safe for E-Commerce, Computerworld, Jun. 2000, pp. 1-2.

(Continued)

*Primary Examiner*—Gregory M Desire
(74) *Attorney, Agent, or Firm*—King & Spalding LLP

(57) ABSTRACT

A method and system for discovering from a database an object which is confusingly similar with a known object. A database, such as the internet, is searched for objects which, when discovered, may be duplicated and stored. A determination is then made if any object from the database is confusingly similar with a known object. A computer-readable storage medium storing program for causing a processing system to perform the steps of duplicating objects from a database to produce duplicated objects; storing the duplicated produce to produce stored duplicated objects; and determining if any stored duplicated object is confusingly similar with a known object.

16 Claims, 19 Drawing Sheets

U.S. PATENT DOCUMENTS

| | | |
|---|---|---|
| 5,210,704 A | 5/1993 | Husseiny |
| 5,274,824 A | 12/1993 | Howarth |
| 5,278,901 A | 1/1994 | Shieh et al. |
| 5,309,562 A | 5/1994 | Li |
| 5,311,593 A | 5/1994 | Carmi |
| 5,345,595 A | 9/1994 | Johnson et al. |
| 5,347,450 A | 9/1994 | Nugent |
| 5,353,393 A | 10/1994 | Bennett et al. |
| 5,359,659 A | 10/1994 | Rosenthal |
| 5,371,852 A | 12/1994 | Attanasio et al. |
| 5,398,196 A | 3/1995 | Chambers |
| 5,414,833 A | 5/1995 | Hershey et al. |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. |
| 5,586,260 A | 12/1996 | Hu |
| 5,590,331 A | 12/1996 | Lewis et al. |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,649,095 A | 7/1997 | Cozza |
| 5,649,185 A | 7/1997 | Antognini et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,978 A | 2/1999 | Hoskins |
| 5,875,296 A | 2/1999 | Shi et al. |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus |
| 5,899,999 A | 5/1999 | De Bonet |
| 5,907,834 A | 5/1999 | Kephart et al. |
| 5,913,205 A * | 6/1999 | Jain et al. ................. 707/2 |
| 5,919,257 A | 7/1999 | Trostle |
| 5,919,258 A | 7/1999 | Kayashima et al. |
| 5,922,051 A | 7/1999 | Sidey |
| 5,925,126 A | 7/1999 | Hsieh |
| 5,931,946 A | 8/1999 | Terada et al. |
| 5,940,591 A | 8/1999 | Boyle et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,218 A * | 11/1999 | Syeda-Mahmood ............ 707/3 |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A | 11/1999 | Conklin et al. |
| 5,999,711 A | 12/1999 | Misra et al. |
| 5,999,723 A | 12/1999 | Nachenberg |
| 6,003,132 A | 12/1999 | Mann |
| 6,006,016 A | 12/1999 | Faigon et al. |
| 6,009,467 A | 12/1999 | Ratcliff et al. |
| 6,014,645 A | 1/2000 | Cunningham |
| 6,016,553 A | 1/2000 | Schneider et al. |
| 6,021,510 A | 2/2000 | Nachenberg |
| 6,026,442 A | 2/2000 | Lewis et al. |
| 6,029,256 A | 2/2000 | Kouznetsov |
| 6,035,323 A | 3/2000 | Narayen et al. |
| 6,035,423 A | 3/2000 | Hodges et al. |
| 6,041,347 A | 3/2000 | Harsham et al. |
| 6,052,709 A | 4/2000 | Paul |
| 6,061,795 A | 5/2000 | Dircks et al. |
| 6,067,410 A | 5/2000 | Nachenberg |
| 6,070,190 A | 5/2000 | Reps et al. |
| 6,070,244 A | 5/2000 | Orchier et al. |
| 6,073,172 A | 6/2000 | Frailong et al. |
| 6,081,894 A | 6/2000 | Mann |
| 6,085,224 A | 7/2000 | Wagner |
| 6,088,803 A | 7/2000 | Tso et al. |
| 6,088,804 A | 7/2000 | Hill et al. |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,144,961 A | 11/2000 | de la Salle |
| 6,154,844 A | 11/2000 | Touboul et al. |
| 6,161,109 A | 12/2000 | Matamoros et al. |
| 6,167,520 A | 12/2000 | Touboul |
| 6,173,413 B1 | 1/2001 | Slaughter et al. |
| 6,185,689 B1 | 2/2001 | Todd, Sr. et al. |
| 6,195,687 B1 | 2/2001 | Greaves et al. |
| 6,199,181 B1 | 3/2001 | Rechef et al. |
| 6,205,552 B1 | 3/2001 | Fudge |
| 6,226,372 B1 | 5/2001 | Beebe et al. |
| 6,230,288 B1 | 5/2001 | Kuo et al. |
| 6,266,773 B1 | 7/2001 | Kisor et al. |
| 6,266,774 B1 | 7/2001 | Sampath et al. |
| 6,271,840 B1 | 8/2001 | Finseth et al. |
| 6,272,641 B1 | 8/2001 | Ji |
| 6,275,938 B1 | 8/2001 | Bond et al. |
| 6,275,942 B1 | 8/2001 | Bernhard et al. |
| 6,278,886 B1 | 8/2001 | Hwang |
| 6,279,113 B1 | 8/2001 | Vaidya |
| 6,282,546 B1 | 8/2001 | Gleichauf et al. |

| | | |
|---|---|---|
| 6,298,445 B1 | 10/2001 | Shostack et al. |
| 6,301,668 B1 | 10/2001 | Gleichauf et al. |
| 6,314,520 B1 | 11/2001 | Schell et al. |
| 6,314,525 B1 | 11/2001 | Mahalingham et al. |
| 6,321,338 B1 | 11/2001 | Porras et al. |
| 6,324,627 B1 | 11/2001 | Kricheff et al. |
| 6,324,647 B1 | 11/2001 | Bowman-Amuah |
| 6,324,656 B1 | 11/2001 | Gleichauf et al. |
| 6,334,129 B1 * | 12/2001 | Kiyoki et al. ................. 707/5 |
| 6,338,141 B1 | 1/2002 | Wells |
| 6,338,152 B1 * | 1/2002 | Fera et al. ..................... 714/48 |
| 6,347,374 B1 | 2/2002 | Drake et al. |
| 6,353,385 B1 | 3/2002 | Molini et al. |
| 6,357,008 B1 | 3/2002 | Nachenberg |
| 6,377,994 B1 | 4/2002 | Ault et al. |
| 6,396,845 B1 | 5/2002 | Sugita |
| 6,397,242 B1 | 5/2002 | Devine et al. |
| 6,397,245 B1 | 5/2002 | Johnson, II et al. |
| 6,405,318 B1 | 6/2002 | Rowland |
| 6,405,364 B1 | 6/2002 | Bowman-Amuah |
| 6,408,391 B1 | 6/2002 | Huff et al. |
| 6,415,321 B1 | 7/2002 | Gleichauf et al. |
| 6,429,952 B1 | 8/2002 | Olbricht |
| 6,434,615 B1 | 8/2002 | Dinh et al. |
| 6,438,600 B1 | 8/2002 | Greenfield et al. |
| 6,445,822 B1 | 9/2002 | Crill et al. |
| 6,453,345 B2 | 9/2002 | Trcka et al. |
| 6,453,346 B1 | 9/2002 | Garg et al. |
| 6,460,141 B1 | 10/2002 | Olden |
| 6,463,426 B1 | 10/2002 | Lipson et al. |
| 6,470,449 B1 | 10/2002 | Blandford |
| 6,477,585 B1 | 11/2002 | Cohen et al. |
| 6,477,648 B1 | 11/2002 | Schell et al. |
| 6,477,651 B1 | 11/2002 | Teal |
| 6,484,149 B1 * | 11/2002 | Jammes et al. ................ 705/26 |
| 6,484,203 B1 | 11/2002 | Porras et al. |
| 6,487,666 B1 | 11/2002 | Shanklin et al. |
| 6,496,858 B1 | 12/2002 | Frailong et al. |
| 6,499,107 B1 | 12/2002 | Gleichauf et al. |
| 6,510,523 B1 | 1/2003 | Perlman et al. |
| 6,517,587 B2 | 2/2003 | Satyavolu et al. |
| 6,519,647 B1 | 2/2003 | Howard et al. |
| 6,519,703 B1 | 2/2003 | Joyce |
| 6,530,024 B1 | 3/2003 | Proctor |
| 6,535,227 B1 | 3/2003 | Fox et al. |
| 6,546,493 B1 | 4/2003 | Magdych et al. |
| 6,563,959 B1 | 5/2003 | Troyanker |
| 6,574,737 B1 | 6/2003 | Kingsford et al. |
| 6,578,147 B1 | 6/2003 | Shanklin et al. |
| 6,584,454 B1 | 6/2003 | Hummel, Jr. et al. |
| 6,601,190 B1 | 7/2003 | Meyer et al. |
| 6,606,744 B1 | 8/2003 | Mikurak |
| 6,618,501 B1 | 9/2003 | Osawa et al. |
| 6,628,824 B1 | 9/2003 | Belanger |
| 6,631,364 B1 * | 10/2003 | Rioux et al. ................... 707/2 |
| 6,636,635 B2 * | 10/2003 | Matsugu ..................... 382/218 |
| 6,647,139 B1 | 11/2003 | Kunii et al. |
| 6,647,400 B1 | 11/2003 | Moran |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 | 1/2004 | Munson et al. |
| 6,691,232 B1 | 2/2004 | Wood et al. |
| 6,704,874 B1 | 3/2004 | Porras et al. |
| 6,708,212 B2 | 3/2004 | Porras et al. |
| 6,711,127 B1 | 3/2004 | Gorman et al. |
| 6,711,615 B2 | 3/2004 | Porras et al. |
| 6,718,063 B1 * | 4/2004 | Lennon et al. ............. 382/224 |
| 6,718,383 B1 | 4/2004 | Hebert |
| 6,721,806 B2 | 4/2004 | Boyd et al. |
| 6,725,377 B1 | 4/2004 | Kouznetsov |
| 6,725,378 B1 | 4/2004 | Schuba et al. |
| 6,751,363 B1 * | 6/2004 | Natsev et al. ............... 382/305 |
| 6,775,780 B1 | 8/2004 | Muttik |
| 6,792,144 B1 | 9/2004 | Yan et al. |
| 6,792,546 B1 | 9/2004 | Shanklin et al. |
| 6,804,683 B1 * | 10/2004 | Matsuzaki et al. ........ 707/104.1 |
| 6,816,973 B1 | 11/2004 | Gleichauf et al. |
| 6,834,288 B2 * | 12/2004 | Chen et al. ................ 707/104.1 |
| 6,839,850 B1 | 1/2005 | Campbell et al. |
| 6,956,569 B1 * | 10/2005 | Roy et al. .................... 345/426 |
| 7,130,466 B2 * | 10/2006 | Seeber ....................... 382/218 |
| 2001/0034847 A1 | 10/2001 | Gaul, Jr. |
| 2002/0032717 A1 | 3/2002 | Malan et al. |
| 2002/0032793 A1 | 3/2002 | Malan et al. |
| 2002/0032880 A1 | 3/2002 | Poletto et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0114522 A1 | 8/2002 | Seeber |
| 2002/0138753 A1 | 9/2002 | Munson |
| 2002/0140745 A1 * | 10/2002 | Ellenby et al. .............. 345/848 |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2004/0010718 A1 | 1/2004 | Porras et al. |
| 2007/0130112 A1 * | 6/2007 | Lin .............................. 707/2 |
| 2007/0233622 A1 * | 10/2007 | Willcock ..................... 706/16 |
| 2008/0046312 A1 * | 2/2008 | Shany et al. .................. 705/14 |

FOREIGN PATENT DOCUMENTS

| | | |
|---|---|---|
| EP | 0 985 995 | 8/2003 |
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/54458 | 9/2000 |
| WO | WO 01/84285 | 11/2001 |
| WO | WO 02/06928 | 1/2002 |
| WO | WO 02/056152 | 7/2002 |
| WO | WO 02/101516 | 12/2002 |

OTHER PUBLICATIONS

Newman, David, Intrusion Detection Systems, Data Communications, 1998, pp. 1-9.

International Search Report for PCT/US02/17161 of Dec. 31, 2002.

Hyland, et al., Concentric Supervision of Security Applications: A New Security Management Paradigm Computer Security Applications Conference, 1998, pp. 59-68.

Koilpillai et al., Recon-A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.

Mansouri-Samani et al., A Configurable Event Service for Distributed Systems Configurable Distributed Systems, 1996, pp. 210-217.

International Search Report for PCT/US01/13769 of Mar. 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.

International Search Report for PCT/US02/04989of Sep. 19, 2002.
International Search Report for PCT/US02/02917 of Aug. 8, 2002.
International Search Report for PCT/US03/00155 of May 15, 2003.
NXI Communications, Inc., White Paper, NTS Security Issues, Oct. 15, 2001, pp. 1-12.
Mounji et al., Distributed Audit Trail Analysis, Proceedings of the Symposium of Network and Distributed System Security, San Diego, CA, Feb. 16-17, 1995, pp. 102-112.
Wobber et al., Authentication on the Taos Operating System, ACM Transactions on Computer Systems, vol. 12, No. 1, Feb. 1994, pp. 3-32.
Mayer et al., The Design of the Trusted Workstation: A True Infosec Product, 13th National Computer Security Conference, Washing, DC, Oct. 1-4, 1990, pp. 827-839.
Dawson, Intrusion Protection for Networks, Byte, Apr. 1995, pp. 171-172.
Buhkan, Checkpoint Charlie, PC Week Network, Nov. 27, 1995, pp. N1, N6-N7.
Process Software Technical Support Page, found on http://www.process.com/techsupport/whitesec.html, printed off of the Process Software website on Feb. 26, 2003, pp. 1-5.
Ganesan, B Afirewall: A Modern Firewall Design, Proceedings Internet Society Symposium on Network and Distributed System Security 1994, Internet Soc., 1994, pp. 99-108.
Lee, Trusted Systems, Chapter II-1-6 Handbook of Information Security Management, Ed. Zella G. Ruthberg and Harold F. Tipton, Auerbach, Boston and New York, 1993, pp. 345-362.
Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.
Guha et al., Network Security via Reverse Engineering of TCP Code: Vulnerability Analysis and Proposed Solution, IEEE, Mar. 1996, pp. 603-610.
Garg et al., High Level Communication Primitives for Concurrent Systems, IEEE, 1988, pp. 92-99.
Hastings et al., TCP/IP Spoofing Fundamentals, IEEE, May 1996, pp. 218-224.
Snapp, Signature Analysis and Communication Issues in a Distributed Intrusion Detection System, Master Thesis, University of California, Davis, California, 1991, pp. 1-40.
Guha et al., Network Security via Reverse Engineering of TCP Code: Vulnerability Analysis and Proposed Solutions, IEEE, Jul. 1997, pp. 40-48.
Djahandari et al., An MBone for an Application Gateway Firewall, IEEE, Nov. 1997, pp. 72-81.
Kim et al., Implementing a Secure Login Environment: A Case Study of Using a Secure Network Layer Protocol, Department of Computer Science, University of Alabama, Jun. 1995, pp. 1-9.
Satyanarayanan, Integrating Security in a Large Distributed System, Acm Transaction on Computer Systems, vol. 7, No. 3, Aug. 1989, pp. 47-280.
Sammons, Nathaniel, "Multi-platform Interrogation and Reporting with Rscan," The Ninth Systems Administration Conference, LISA 1995, Monterrey, California, Sep. 17-22, 1995, pp. 75-87.
Dean et al., "Java Security: From HotJava to Netscape and Beyond," Proceedings of the 1996 IEEE Symposium on Security and Privacy, May 6-8, 1996, Oakland, California, pp. 190-200.
Fisch et al., "The Design of an Audit Trail Analysis Tool," Proceedings of the 10th Annual Computer Security Applications Conference, Dec. 5-9, 1994, Orlando, Florida, pp. 126-132.
Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.
Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.
Casella, Karen A., "Security Administration in an Open Networking Environment," The Ninth Systems Administration Conference, LISA 1995, Monterrey, California, Sep. 17-22, 1995, pp. 67-73.
Burchell, Jonathan, "Vi-SPY: Universal NIM?" Virus Bulletin, Jan. 1995, pp. 20-22.
Benzel et al., "Identification of Subjects and Objects in a Trusted Extensible Client Server Architecture," 18th National Information Systems Security Conference, Oct. 10-13, 1995, Baltimore, Maryland, pp. 83-99.
Epstein et al., "Component Architectures for Trusted Netware," 18th National Information Systems Security Conference, Oct. 10-13, 1995, Baltimore, Maryland, pp. 455-463.
Varadharajan, Vijay, "Design and Management of a Secure Networked Administration System: A Practical Approach," 19th National Information Systems Security Conference, Oct. 22-25, 1996, Baltimore, Maryland, pp. 570-580.
Snapp et al., "DIDS (Distributed Intrusion Detection System)—Motivation Architecture, and An Early Protoype," 14th National Computer Security Conference, Oct. 1-4, 1991, Washington, DC, pp. 167-176.
Broner et al., "IntelligentI/O Rule-Based Input/Output Processing for Operating Systems," Operating Systems Review, vol. 25, No. 3, Jul. 1991, pp. 10-26.
Drews et al., "Special Delivery—Automatic Software Distribution Can Make You A Hero," Network Computing, Aug. 1, 1994, pp. 80, 82-86, 89, 91-95.
Morrissey, Peter, "Walls," Network Computing, Feb. 15, 1996, pp. 55-59, 65-67.
Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.
Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.
Anderson, Paul, "Towards a High-Level Machine Configuration System," Proceedings of the Eighth Systems Administration Conference (LISA VIII), Sep. 19-23, 1994, San Diego, California, pp. 19-26.
Cooper, Michael A., "Overhauling Rdist for the '90s," Proceedings of the Sixth Systems Administration Conference (LISA VI), Oct. 19-23, 1992, Long Beach, California, pp. 175-188.
Vangala et al., "Software Distribution and Management in a Networked Environment," Proceedings of the Sixth Systems Administration Conference, Oct. 19-23, 1992, Long Beach, California, pp. 163-170.
Kim et al., "The Design and Implementation of Tripwire: A File System Integrity Checker," 2nd ACM Conference on Computer and Communications Security, Nov. 2-4, 1994, Fairfax, Virginia, pp. 18-29.
Winn Schwartau, "e.Security™-Solving 'Dumb Days' With Security Visualization," e-Security, Inc., Naples, FL 34103, 2000.
Anita D'Amico, Ph.D., "Assessment of Open e-Security Platform™; Vendor-Independent Central Management of Computer Security Resources," Applied Visions, Inc., 1999.
"e-Security™-Open Enterprise Security Management: Delivering an integrated, automated, centrally Managed Solution You Can Leverage Today and Tomorrow," e-Security, Inc., Naples, FL 34102, 1999.
"e-Security™-Vision," e-Security, Inc., Naples, FL, 1999.
"e-Security™-Administrator Workbench™," e-Security, Inc. Naples, FL, 1999.
"e-Security™-Fact Sheet," e-Security, Inc., Naples, FL, 1999.
"e-Security™-Open e-Security Platform™," e-Security, Inc. Naples, FL, 1999.
Babcock, "E-Security Tackles The Enterprise," Jul. 28, 1999; *Inter@active* Week, www.Zdnet.com.
Kay Blough, "In Search of More-Secure Extranets," Nov. 1, 1999, www.InformationWeek.com.
Paul H. Desmond, "Making Sense of Your Security Tools," Software Magazine and Wiesner Publishing, www.softwaremag.com, 1999.
Kay Blough, "Extra Steps Can Protect Extranets," Nov. 1, 1999, www. InformationWeek.com.
Sean Hao, "Software protects e-commerce—e-Security's product alerts networks when hackers attack," Florida Today, Florida.
Scott Weiss, "Security Strategies—E-Security, Inc.," product brief, Hurwitz Group, Inc., Mar. 24, 2000.

Sean Adee, CISA, "Managed Risk, Enhanced Response -The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

e.Security—"Introducing the First Integrated, Automated, and Centalized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions," Apr. 3, 2000, Post-Newsweek Business Information, Inc., www.gcn.com.

eSecurity™, website pages (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connecton Security Analysis, grc.com/default.htm, Laguna Hills, California, 2000.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This, Inform, Association for Information and Image Management, Silver Spring, Sep./Oct. 1999, pp. 1-4.

Stevens, TCP/IP Illustrated, vol. 1, 1994, pp. 247.

Lee et al., A Genetic Virus Detection Agent on the Internet, IEEE, 30th Annual Hawaii International Conference on System Sciences, 1997, vol. 4.

Cutler, Inside Windows NT, 1993, Microsoft Press.

Duncan, Advanced MD-Dos, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millennium, Aug. 1999, Network Associates, A Network Associates Executive White Paper, pp. 1-14.

Enterprise-Grade Anti-Virus Automation in the 21st Century, Jun. 2000, Symantec, Technology Brief, pp. 1-17.

Kephart et al., Blueprint for a Computer Immune System, 1997, Retrieved from Internet, URL: http//www.research.ibm.com/antivirus/scipapers/kephart/VB97, pp. 1-15.

Richardson, Enterprise Antivirus Software, Feb. 2000, Retrieved from Internet, URL: http://www.networkmagazine.com/article/nmg20000426S0006, pp. 1-6.

Understanding and Managing Polymorphic Viruses, 1996, Symantec, The Symantec Enterprise Papers, vol. XXX, pp. 1-13.

Gong, JavaTM Security Architecture (JDK1.2), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings, 3rd International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsoft.com/archive/default.asp?url=/archive/en-us/dnarvc/html/msdn_c7pcode2.asp, pp. 1-6, Apr. 1992.

DJGPP COFF Spec, http://delorie.com/digpp/doc/coff/, pp. 1-15, Oct. 1996.

Natvig, Sandbox Technology Inside AV Scanners, Virus Bulletin Conference, Sep. 2001, pp. 475-488.

Norman introduces a new technique for eliminating new computer viruses, found on Norman's website, file://c:/documents%20and%20settings\7489\local%20settings\temporary%20internet%20files\olk, pp. 1-2, published Oct. 25, 2001, printed from website Dec. 27, 2002.

International Search Report for PCT/US01/19142 of Jan. 17, 2003.

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www-bfs.ucsd.edu/mss/esos/man3.htm, Sep. 3, 1996.

Nasire, NASIRC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net.html, Mar. 20, 1997.

Sundaram, An Introduction to Intrusion Detection, Copyright 1996, published at www.acm.org/crossroads/xrds2-4/intrus.html, pp. 1-12.

Samfat, IDAMN: An Intrusion Detection Architecture for Mobile Networks, IEEE Journal on Selected Areas in Communications, vol. 15, No. 7, Sep. 1997, pp. 1373-1380.

Info: Visual Basic Supports P-Code and Native Code Compilation (Q229415), http://support.microsoft.com/support/kb/articles/O229/4/15.ASP, pp. 1-2, Apr. 28, 1999.

International Search Report for PCT/US99/29117 of May 2, 2000.

Nordin, U of MN OIT Security and Assurance, Feb. 9, 2000.

Internet Security Systems, RealSecure SiteProtector, SAFEsuite Decisions to SiteProtector Migration, Aug. 8, 2003, pp. 1-42.

Internet Security Systems, SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Network World Fusion, http://www.nwfusion.com/cgi-bin/mailto/x/cgi, Apr. 21, 1999, p. 1-2.

NeworkICE Corporation, Can You Explain How Your Product Can Protect a Remote User with a VPN Client?, 1998-1999, pp. 1-2, http://www.webarchive.org/web/20003040714115/advice.networkice.com/advice/support/kb/q000003/default.

Yasin, Start-Up Puts Network Intruders on Ice, http://www.internetweek.com/story/INW19990505S0001, May 5, 1999, pp. 1-2.

Morency, NetworkWorldFusion, http://nwfusion.com/cgi-bin/mailto/x.cgi, Jun. 28, 1999, pp. 1-2.

Rogers, Network ICE Touts Security Wares, Apr. 23, 1999, San Mateo, California, http://www.crn.com/showArticle.jhtml?articleID=18829106&flatPage=true, pp. 1-2.

Rogers, Network ICE Signs Resellers, May 26, 1999, San Mateo, California, http://www.crn.com/showArticle.jhtml?articleID=18805302&flatPage=true, pp. 1-2.

Internet Security Systems, I've Been Attacked! Now What?, Aug. 27, 1999, http://www.iss.net/security_center/advice/Support/KB/q000033/default.htm, pp. 1-2.

Internet Security Systems, What is the Format of "Attack-List.CSV"?, Aug. 21, 1999, http://www.iss.net/security_center/advice/Support/KB/q000018/default.htm, pp. 1-2.

Neumann et al., Experience with Emerald to Date, Apr. 11-12, 1999, 1st USENIX Workshop on Intrusion Detection and Network Monitoring, Santa Clara, California, pp. 1-9.

Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.

Kendall, A Database of Computer Attacks for the Evaluation of Intrusion Detection Systems, Jun. 1999, Department of Defense Advanced Research Projects Agency, pp. 1-124.

Neumann, Computer Security and the U.S. Infrastructure, Nov. 6, 1997, Congressional Testimony, pp. 1-11.

Porras et al., Life Traffic Analysis of TCP/IP Gateways, Nov. 10, 1997, Internet Society's Networks and Distributed Systems Security Systems Symposium, Mar. 1998, http://www.sdl.sri.com/projects/emerald/live-traffic.html, pp. 1-6.

Raynaud et al., Integrated Network Management IV, 1995, Proceedings of the 4th International Symposium on Integrated Network Management, pp. 1-2 and 5-16.

Heberlein et al., A Method to Detect Intrusive Activity in a Networked Environment, Oct. 1-4, 1991, 14th National Computer Security Conference, Washington, D.C., pp. 362-363 and 365-371.

Ko et al., Execution Monitoring of Security-Critical Programs in Distributed Systems: A Specification-Based Approach, 1997, Proceedings of the 1997 IEEE Symposium on Security and Privacy, pp. 175-187.

Crosbie et al., Active Defense of a Computer System Using Autonomous Agents, Technical Report No. 95-008, Feb. 15, 1995, Purdue University, West Lafayette, Indiana, pp. 1-14.

Mansouri-Samani et al., Monitoring Distributed Systems, Nov. 1993, IEEE Network, pp. 20-30.

Jakobson et al., Alarm Correlation, Nov. 1993, IEEE Network, pp. 52-59.

Anderson et al., Next-Generation Intrusion Detection Expert (NIDES), A Summary, May 1995, SRI International, pp. 1-37.

Veritas Software, Press Release, Robust Enhancements in Version 6.0 Maintain Seagate WI as the De Facto Standard for Software Distribution, Oct. 6, 1997, Press Releases, pp. 1-4, http://216.239.39.104/search?q=cache:HS9kmK_1m2QoJ:www.veritas.com/us/aboutus/pressroom/199 . . . .

Yasin, Network-Based IDS are About to Stop Crying Wolf, Security Mandate: Silence False Alarms, Apr. 9, 1999, http://lists.jammed.com/ISN/1999/04/0021.html, pp. 1-3.

Internet Security Systems, Press Release, ISS Reports Record Revenues and Net Income for Second Quarter, Jul. 19, 1999, http://bvlive01.iss.net/issEn/delivery/prdetail.isp?type=Financial&oid=14515, pp. 1-5.

LaFadula, State of the Art in CyberSecurity Monitoring, A Supplement, Sep. 2001, Mitre Corporation, pp. 1-15.

Balasubramiyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.

Crosbie et al., Defending a Computer System Using Autonomous Agents, Mar. 11, 1994, Technical Report No. 95-022, Purdue University, West Lafayette, Indiana, pp. 1-11.

Denning, An Intrusion-Detection Model, Feb. 1987, IEEE Transactions on Software Engineering, vol. SE-13, No. 2, pp. 1-17.

Lunt, A Survey of Intrusion Detection Techniques, 1993, Computers & Security, 12 (1993), pp. 405-418.

Porras et al., Penetration State Transition Analysis A Rule-Based Intrusion Detection Approach, 1992, pp. 220-229.

Javitz et al., The NIDES Statistical Component: Description and Justification, SRI International, Menlo Park, California, SRI Project 3131, Mar. 7, 1994.

Lindqvist et al., Detecting Computer and Network Misuses Through the Production-Based Expert System Toolset (P-BEST), Oct. 25, 1998, pp. 1-20.

Javitz et al., The SRI IDES Statistical Anomaly Detector, SRI Internationa, Menlo Park, California, May 1991, IEEE Symposium on Security and Privacy, pp. 1-11.

Porras et al., Live Traffic Analysis of TCP/IP Gateways, Nov. 10, 1997, SRI International, Menlo Park, California, pp. 1-16.

Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.

Information & Computing Sciences: System Design Laboratory: Programs: Intrusion Detection, SRI International, http://www.sdl.sri.com/programs/intrusion/, Jun. 17, 2004, pp. 1-2.

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.

Almgren et al., Application-Integrated Data Collection for Security Monitoring, Oct. 10-12, 2001, SRI International, Menlo Park, California, pp. 1-15.

Debar et al., Research Report: A Revised Taxonomy for Intrusion-Detection Systems, Oct. 25, 1999, IBM Research, Switzerland, pp. 1-23.

Porras et al., Emerald: Event Monitoring Enabling Responses to Anomalous Live Disturbances, Computer Science Laboratory, SRI International, Menlo Park, CA, Dec. 18, 1996, pp. 1-3.

Frequently-Asked Questions about RealSecure, pp. 1-14, http://web.archive.org/web/19970721183227/iss.net/prod/rs_faq.html, May 30, 1997.

Cisco Systems, Inc., Empowering the Internet Generation, 1998.

Internet Security Systems, Inc., RealSecure Release 1.2 for UNIX, A User Guide and Reference Manual, 1997.

Internet Security Systems, Inc., Real-time attack recognition and response: A solution for tightening network security, Jan. 1997, pp. 1-13.

Internet Security Systems, Inc., SAFEsuite Decisions User Guide, Version 1.0, 1998, pp. 1-78.

NetworkICE Corporation, ICEcap Administrator's Guide, Version 1.0 BETA, 1999, pp. 1-142.

Debar, Herve et al., A Neural Network Component for an Intrusion Detection System, 1992, pp. 240-250.

SRI International, A Prototype IDES: A Real-Time Intrusion-Detection Expert System, Aug. 1987, p. 1-63.

SRI International, Requirements and Model for IDES-A Real-Time Intrusion-Detection Expert System, Aug. 1985, pp. 1-70.

SRI International, An Intrusion-Detection Model, Nov. 1985, pp. 1-29.

Dowell et al., The ComputerWatch Data Reduction Tool, Proc. of the 13th National Computer Security Conference, Washington, D.C., Oct. 1990, pp. 99-108.

Fox et al., A Neural Network Approach Towards Intrusion Detection, Jul. 2, 1990, pp. 125-134.

Garvey et al., Model-Based Intrusion Detection, Oct. 1991, pp. 1-14.

Ilgun et al., State Transition Analysis: A Rule-Based Intrusion Detection Approach, Mar. 1995, pp. 181-199.

Javitz et al., The SRI IDES Statistical Anomaly Detector, May 1991, pp. 1-11.

SRI International, The NIDES Statistical Component Description and Justification, Mar. 7, 1994, pp. 1-46.

Karen, Oliver, PC Magazine, The Digital Doorman, Nov. 16, 1999, p. 68.

Liepins et al., Anomaly Detection: Purpose and Frameowrk, 1989, pp. 495-504.

Lindqvist et al., Detecting Computer and Network Misuse Through the Production-Bases Expert System Toolset (P-BEST), Oct. 25, 1998, pp. 1-20.

Lunt, Teresa, A survey of intrusion detection techniques, 1993, pp. 405-418.

Lunt, Teresa, Automated Audit Trail Analysis and Intrusion Detection: A Survey, Oct. 1988, pp. 1-8.

Porras et al., Penetration State Transition Analysis A Rule-Based Intrusion Detection Approach, 1992, pp. 220-229.

Sebring et al., Expert Systems in Intrusion Detection: A Case Study, Oct. 1988, pp. 74-81.

Shieh et al., A Pattern-Oriented Intrusion-Detection Model and Its Applications, 1991, pp. 327-342.

Smaha, Stephen, Haystack: An Intrusion Detection System, 1988.

Snapp, Steven Ray, Signature Analysis and Communication Issues in a Distributed Intrusion Detection System, 1991, pp. 1-40.

Porras et al., EMERALD: Event Monitoring Enabling Responses to Anomalous Live Disturbances, Oct. 1997, pp. 353-365.

Lunt et al., Knowledge-Based Intrusion Detection, Mar. 1989, pp. 102-107.

Lunt et al., An Expert System to Classify and Sanitize Text, Dec. 1987, pp. 1-5.

Tener, William, Computer Security in the Age of Information, AI & 4GL: Automated Detection and Investigation Tools, 1989, pp. 23-29.

Teng et al., Adaptive Real-time Anomaly Detection Using Inductively Generated Sequential Patterns, 1990, pp. 278-284.

Vaccaro et al., Detection of Anomalous Computer Session Activity, 1989, pp. 280-289.

Winkler, J.R., A UNIX Prototype for Intrusion and Anomaly Detection in Secure Networks, 1990, pp. 115-124.

Boyen et al. Tracable Inference for Complex Stochastic Process, Jul. 24-26, 1998.

Copeland, Observing Network Traffic—Techniques to Sort Out the Good, the Bad, and the Ugly, 2000, pp. 1-7.

Goan, Terrance, Communications of the ACM, A Cop on the Beat Collecting and Appraising Intrusion Evidence, Jul. 1999, pp. 47-52.

Heberlein et al., A network Security Monitor, 1990, pp. 296-304.

Jackson et al., An Expert System Applications for Network Intrusion Detection, Oct. 1991, pp. 1-8.

Lankewicz et al., Real-Time Anomaly Detection Using a Nonparametric Pattern Recognition Approach, 1991, pp. 80-89.

Lippmann et al., Evaluating Intrusion Detection Systems: The 1998 DARPA Off-line Intrusion Detection Evaluation, 1999.

Munson et al., Watcher: The Missing Piece of the Security Puzzle, Dec. 2001.

Pearl, Judea, Probabilistic Reasoning in Intelligent Systems: Networks of Plausible Inference, Sep. 1988.

Porras et al., Live Traffic Analysis of TCP/IP Gateways, Dec. 12, 1997, pp. 1-13.

Emerald TCP Statistical Analyzer 1998 Evaluation Results, http://www.sdl.sri.com/projects/emerald/98-eval-estat/index.html, Jul. 9, 1999, pp. 1-15.

Stanifold-Chen, GrIDS-A Graph Based Intrusion Detection System for Large Networks, Oct. 1996.

Tener, William, Discovery: An Expert System in the Commercial Data Security Environment, Dec. 1986, pp. 45-53.

Valdes et al., Adaptive, Model-Based Monitoring for Cyber Attack Detection, 2000, pp. 1-19.

SRI International, Blue Sensors, Sensor Correlation, and Alert Fusion, Oct. 4, 2000.

Valdes et al., Statistical Methods for Computer Usage Anomaly Detection Using NIDES, Jan. 27, 1995, pp. 306-311.

Wimer, Scott, The Core of CylantSecure, http://www.cylant.com/products/core.html, 1999, pp. 1-4.

Zhang et al., A Hierarchical Anomaly Network Intrusion Detection Systyem using Neural Network Classification, Feb. 2001.

Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.

Linux Weekly News, http://lwn.net/1998/0910shadow.html, Sep. 8, 1998, pp. 1-38.

Cracker Tracking: Tighter Security with Intrucsion Detection, http://www.byte.com/art/9805/sec20/art1.htm, May 1998, pp. 1-8.

Cisco Systems, Inc., Network RS: Intrusion Detection and Scanning with Active Audit Session 1305, 1998.

Business Security Advisor Magazine, Intrusion Detection Systems: What You Need to Know, http://advisor.com/doc/0527, Sep. 1998, pp. 1-7.

Garvey et al., An Inference Technique for Integrating Knowledge from Disparate Sources, Multisensor Intregration and Fusion for Intelligenct Machines and Systems, 1995, pp. 458-464.

Power et al., CSI Intrusion Detection System Resource, Jul. 1998, pp. 1-7.

Cisco Systems, Inc., NetRanger User's Guide Version 2.1.1, 1998.

Internet Security Systems, Real-Time Attack Recognition and Repsonse: A Solution for Tightening Network Security, http://www.iss.net, 1997, pp. 1-13.

Network ICE Corporation, Network ICE Product Documentation, pp. 1-3, http://www.web.archive.org/web/20011005080013/www.networkice.com/support/documentation.html, Jul. 6, 2004.

Network ICE Corporation, Network ICE Documentation, p. 1, http://www.web.archive.org/web/19991109050852/www.networkice.com/supports/docs.htm, Jul. 6, 2004.

Network ICE Corporation, Network ICE Press Releases, p. 1, http://www.web.archive.org/web/19990903214428/www.netice.com/company/pressrelease/press.htm, Jul. 7, 2004.

Network ICE Corporation, Network ICE Press Releases, p. 1, http://www.web.archive.org/web/20000304074934/www.netice.com/company/pressrelease/press.htm, Jul. 7, 2004.

Brentano et al., An Architecture for Distributed Intrusion Detection System, Department of Energy Computer Security Group, 14th Annual Conference Proceedings, pp. (17)25-17(45), May 1991.

Staniford-Chen et al., GrIDS-A Graph Based Intrusion Detection System for Large Networks, University of California, Davis, California, 19th National Information Systems Security Conference, 1996, pp. 1-10.

Ricciulli et al., Modeling Correlated Alarms in Network Management Systems, SRI International, Menlo Park, California, Proceedings of the Conference on Communication Networks and Distributed System Modeling and Simulation, 1997, pp. 1-8.

Porras et al., Emerald: Event Monitoring Enabling Responses to Anomalous Live Disturbances, SRI International, Menlo Park, California, 20th National Information Systems Security Conference, Oct. 1997, pp. 1-24.

Porras et al., A Mission-Impact Based Approach to INFOSEC Alarm Correlation, SRI International, Menlo Park, California, Oct. 2002, pp. 1-33.

Phrack 55 Download (234 kb, Sep. 9, 1999), http://www.phrack.org/show.php?p=55&a=9, pp. 1-6.

Porras et al., A Mission-Impact-Based Approach to INFOSEC Alarm Correlation, SRI International, Menlo Park, California, Oct. 2002, pp. 1-19.

Bace, An Introduction to Intrusion Detection and Assessment for System and Network Security Management, 1999, pp. 1-38.

Hunteman, Automated Information System—(AIS) Alarm System, University of California, Los Alamos National Laboratory, 20th National Information System Security Conference, Oct. 1997, pp. 1-12.

Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.

Innella, Intrusion Detection Systems (IDS), Navy Information Assurance, Jun. 28, 2004, pp. 1-4, http://www.infosec.navy.mil/ps/?t=inforsecprodsservices/infosecprodsservices.tag&bc=/infosecprodsservices/b . . . .

Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.

Lunt et al., Knowledge-Based Intrusion Detection, SRI International, Menlo Park, California, Conference on AI Systems in Government, Washington, D.C., Mar. 1989, pp. 102-107.

A. Information Assurance BAA 98-34 Cover Sheet, SRI International, Nov. 1, 2000, pp. 2-35.

NetScreen Products, FAQ, http://www.netscreen.com/products/faq.html, Feb. 28, 2003, pp. 1-6.

Miller, A Network Under Attack: Leverage Your Existing Instrumentation to Recognize and Respond to Hacker Attacks, NetScout Systems, Westford, MA, Apr. 2003, pp. 1-8.

Technology Brief: Intrusion Detection for the Millennium, Internet Security Systems, 2000, pp. 1-6.

Weiss et al., Analysis of Audit and Protocol Data using Methods from Artificial Intelligence, Siemens AG, Munich, Germany, Proc. of the 13th National Computer Security Conference, Washington, D.C., Oct. 1990, pp. 109-114.

Snapp et al., DIDS (Distributed Intrusion Detection System)—Motivation, Architecture, and an Early Protype), University of California, Davis California, Proc. 14th National Computer Security Conference, Washington, D.C., Oct. 1991, pp. 167-176.

Internet Security Systems, Inc., SAFEsuite Enterprise Edition, Project "Gatekeeper" 1.0, Market Requirements Document, Mar. 30, 1998, pp. 1-12.

Internet Security Systems, SAFEsuite Decisions, 2000, pp. 1-2.

Internet Security Systems, Dynamic Threat Protection, Presse-Roundtable, Munich, Germany, Apr. 10, 2003, pp. 1-63.

Internet Security Systems, Preliminary ODM 1.0 Functional Specification, Aug. 1997, pp. 1-7.

Internet Security Systems, Inc., Scanner-ISSDK Interface, Design Specification, Jun. 2, 2000, Draft 1.07, pp. 1-7.

RealSecure, Adaptive Network Security Manager Module Programmer's Reference Manual, pp. 1-74.

Advanced Concept Technology Demonstrations (ACTD), 2005, pp. 1-28.

Frank, Sounding the Alarm, Sep. 6, 1999, Federal Computer Week, pp. 1-2.

Crumb, Intrusion Detection Systems to be Integrated at AFRL, Air Force Research Laboratory, News@AFRL, Fall 1999, pp. 1.

Temin, Case Study: The IA: AIDE System at Two, 15th Annual Computer Security Applications Conference, Dec. 6-10, 1999, Phoenix, Arizona, pp. 1-26.

Spink, Automated Intrusion Detection Environment (AIDE), Intrusion Detection Sensor Fusion, Sep. 7, 1999, pp. 1-25.

Frincke et al., A Framework for Cooperative Intrusion Detection, 21st National Information Systems Security Conference, Oct. 6-9, 1998, Crystal City, Virginia, pp. 1-20.

Anderson et al., In Athena's Camp: Preparing for Conflict in the Information Age, An Exploration of Cyberspace Security R&D Investment Strategies for DARPA: The Day After-in Cyberspace II, Chapter Eleven, 1996, pp. 253-271.

Valdes et al., SRI International, Probabilistic Alert Correlation, 2001, pp. 1-15.

Bass, Multisensor Data Fusion for Next Generation Distributed Intrusion Detection Systems, Apr. 28, 1999, Iris National Symposium, pp. 1-6.

Perrochon et al., Enlisting Event Patterns for Cyber Battlefield Awareness, No Date, Stanford University, pp. 1-12.

Perrochon, Using Contect-Based Correlation in Network Operations and Management, Jul. 2, 1999, Stanford University, pp. 1-20.

Perrochon, Real Time Event Based Analysis of Complex Systems, Jun. 1998, pp. 1-9.

Luckham et al., Complex Event Processing in Distributed Systems, Aug. 18, 1988, Stanford University, pp. 1-26.

Pettigrew, US Southcom United States Southern Command's Information Sharing Projects, Summer 1999, IAnewsletter, vol. 3, No. 1, pp. 1-24.

Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.

Cheung et al., The Design of GrIDS: A Graph-Based Intrusion Detection System, Jan. 26, 1999, University of California, pp. 1-51.

Cohen et al., Report of the Reporting and Analysis Track, Detection of Malicious Code, Intrusions, and Anomalous Activities Workshop, Feb. 22-23, 1999, pp. 1-47.

Garofalakis et al., Network Mining and Analysis: The Nemesis Project, Bell Labs, Lucent Technologies, No Date, pp. 1-12.

RealSecure ICEcap Manager User Guide Version 3.6, Internet Security Systems, Inc., 1998-2002, pp. 1-228.

Cuppens, Cooperative Intrusion Detection, Date Unknown, pp. 1-10.

Mukherjee et al., Network Intrusion Detection, IEEE Network, May/Jun. 1994, pp. 26-41.

Machlis, Net Monitoring Tools Gain Real-Time Alerts, Apr. 14, 1997, http://www.computerworld.com, pp. 1-12.

OmniGuard/ITA Intruder Alert, AXENT Technologies, Inc., Nov. 17, 2004, http://www.web.archive.org, pp. 1-10.

NetRanger Overview, Chapter 1, Date Unknown, pp. 1-16.

Sutterfield, Large-Scale Network Intrusion Detection, 1997, WheelGroup Corporation, pp. 1-10.

Kumar et al., An Application of Pattern Matching in Intrusion Detection, Technical Report No. CSD-TR-94-013, Jun. 17, 1994, Purdue University, pp. 1-55.

Huang et al., A Large-Scale Distirbuted Intrusion Detection Framework Based on Attack Strategy Analysis, Date Unknown, The Boeing Company, pp. 1-12.

Perrochon et al., Event Mining with Event Processing Networks, Date Unknown, Stanford University, pp. 1-4.

Gruschke, Integrated Event Management: Event Correlation Using Dependency Graphs, presented at DSOM 1998, University of Munich, pp. 1-12.

Bass, Intrusion Detection System and Multisensor Data Fusion, Apr. 2000, Communications of the ACM, vol. 43, No. 4, pp. 99-105.

Bass et al., A Glimpse into the Future of ID, Date Unknown, Usenix, pp. 1-10.

LaPadula, State of the Art in Anomaly Detection and Reaction, Jul. 1999, Mitre Corporation, pp. 1-36.

Rationalizing Security Events with Three Dimensions of Correlation, Date Unknown, NetForensics, Tech Brief, pp. 1-6.

Jou et al., Design and Implementation of a Scalable Intrusion Detection System for the Protection of Network Infrasturcture, Date Unknown, MCNC, pp. 1-15.

Caldwell, Event Correlation: Security's Holy Grail?, Aug. 1, 2002, GuardedNet, pp. 1-21.

Metcalf et al., Intrusion Detection System Requirements, Sep. 2000, Mitre Corporation, pp. 1-33.

Jou et al., Architecture Design of a Scalable Intrusion Detection System for the Emerging Network Infrastructure, Technical Report CDRL A005, Apr. 1997, MCNC, pp. 1-42.

Security Manager for UNIX Systems Version 3.2.1 User's Guide, Feb. 1998, Internet Security Systems, pp. 1-162.

RealSecure Release 1.2 for UNIX a User Guide and Reference Manual, 1997, Internet Security Systems, Inc., pp. 1-92.

Internet Scanner SAFE SAFEsuite 4.0 User Guide and Reference Manual, 1996, Internet Security Systems, Inc., pp. 1-158.

Internet Scanner 3.3 User Guide and Reference Manual, 1996, Internet Security Systems, Inc., pp. 1-119.

Landwehr et al., Newsletter of the IEEE Computer Society's TC on Security and Privacy Electronics, Electronic CIPHER, Nov. 25, 1997, Issue 25, pp. 1-34.

20th National Information Systems Security Conference, Oct. 6-10, 1997, Baltimore, Maryland, pp. 1-44.

Emerald Alert Management Interface User's Guide Version 1.2, Dec. 6, 2000, SRI International, pp. 1-11.

Anderson et al., Detecting Unusual Program Behavior Using the Statistical Component of the Next-Generation Intrusion Detection Expert System (NIDES), May 1995, SRI International, pp. 1-89.

Lunt et al., Detecting Intruders in Computer Systems, 1993 Conference on Auditing and Computer Technology, SRI International, pp. 1-17.

Network ICE Products—ICEcap, Date Unknown, pp. 1-2.

Forlanda, The Secrets to Driving on BlackICE, Jan. 12, 2000, Network ICE, pp. 1-35.

BlackICE User's Guide Version 1.0 Beta Draft, 1999, Network ICE Corporation, pp. 1-59.

ICEcap Administrator's Guide Version 1.0 Beta Draft, 1999, Network ICE Corporation, pp. 1-25.

Shulak et al., ICEcap Advanced Admisitration Guide Version 3.0, 2001, Internet Security Systems Corporation, pp. 1-51.

"Real Secure, OS Sensor User Guide," Version 5.0, © Internet Security Systems, Inc. 199?-2000; Sep. 2000, pp. 1-64.

"Real Secure, User's Guide," Version 3.0, © 1992-1998, Internet Security Systems, Inc., pp. 1-128.

"System Security Scanner, User Guide," Version 1.6, © 1996-1998, Internet Security Systems, Inc., pp. 1-164.
"Real Secure™, Network Engine User Guide," Version 3.2.1, © 1999 by Internet Security Systems, Inc., pp. 1-38.
"Real Secure™, User Guide," Version 3.2.1, © 1999 by Internet Security Systems, Inc., pp. 1-38.
"Real Secure™, Manager for HP Open View User Guide," Version 1.3, © 1999 by Internet Security Systems, Inc., pp. 1-48.
"Database Scanner, User Guide," Version 2.0, © 1992-1999, Internet Security Systems, Inc., pp. 1-112.
"Database Scanner™, User Guide," Version 4.0, © 2000 by Internet Security Systems, Inc., pp. 1-122.
"Database Scanner™, User Guide," Version 3.0.1, © 1999 by Internet Security Systems, Inc., pp. 1-164.
"Real Secure™, Network Sensor User Guide," Version 5.0, © 2000 by Internet Security Systems, Inc., pp. 1-42.
"Real Secure, Server Sensor User Guide," Version 5.5, © Internet Security Systems, Inc. 2000, pp. 1-56.
"Internet Scanner™, User Guide," Version 6.0, Copyright © 1999 by Internet Security Systems, Inc., pp. 1-182.
"Internet Scanner™, User Guide," Version 6.1, © 2000 by Internet Security Systems, Inc., pp. 1-226.
"Internet Scanner™, User Guide," Version 5.6, © 1992-1998, Internet Security Systems, Inc., pp. 1-162.
"Internet Scanner™, User Guide," Version 5.3, © 1992-1998, Internet Security Systems, Inc. pp. 1-173.
"Real Secure, Console User Guide," Version 5.5, © 199?-2000, Internet Security Systems, Inc., pp. 1-162.
"Internet Scanner™, User Guide," Version 5.8, © 1999 by Internet Security Systems, Inc., pp. 1-148.
"SAFEsuite Decisions, User Guide," Version 1.0, © 1992-1998, Internet Security Systems, Inc., pp. 1-88.
"Real Secure™, Console User Guide," Version 5.0, © 2000 by Internet Security Systems, Inc., pp. 1-114.
"SAFEsuite Decisions, User Guide," Version 2.5, © 2000 by Internet Security Systems, Inc., pp. 1-194.
"System Scanner, User Guide," Version 1.7, © 1992-1998, Internet Security Systems, Inc., pp. 1-248.
"Sytem Scanner, User Guide," Version 1.0, © 1996-1998, Internet Security Systems, Inc., pp. 1-140.
"System Scanner™, User Guide," Version 4.0, © 1999 by Internet Security Systems, Inc., pp. 1-178.
Internet Security Systems, Inc., "Introduction to RealSecure Version 5.0, The Industry's Only Integrated Host-Based and Network-Based Intrusion Detection System", Aug. 22, 2000, pp. 1-47.
Internet Security Systems, Inc., "RealSecure Network Sensor and Gigabit Network Sensor Policy Guide Version 7.0", Aug. 2003, pp. 1-86.
Internet Security Systems, Inc., "RealSecure Console User Guide Version 3.1", Jun. 1999, pp. 1-98.
Internet Security Systems, Inc., "RealSecure Version 2.0", Apr. 1998, pp. 1-154.
Internet Security Systems, Inc., "Enhanced Dynamic Threat Protection via Automated Correlation and Analysis", an ISS White Paper, 2002, pp. 1-14.
Internet Security Systems, Inc., "RealSecure Site Protector Comparison Guide for Internet Scanner 7.0 Reporting Version 1.2", Mar. 2003, an ISS Tech Note, pp. 1-15.
Internet Security System, Inc., "RealSecure Site Protector Comparison Guide for ICEcap Manager Version 1.5", Jan. 2002, an ISS Technical White Paper, pp. 1-27.
Internet Security Systems, Inc., "RealSecure SiteProtector Security Fusion Module 2.0 Frequently Asked Questions", Mar. 2003, pp. 1-8.
Internet Security Systems, Inc., "RealSecure SiteProtector Console User Reference Guide Version 2.0 Service Pack 1", Mar. 14, 2003, Chapter 3, pp. 1-27.
Internet Security Systems, Inc., "Proventia Gateway and Network Protection", Jul. 2003, pp. 1-12.
Farley, Internet Security System, Inc., "ID Fusion Technology, A First-Generation Approach", Apr. 29, 1999, National Security Framework Forum, pp. 1-8.
Farley, "RealSecure Fusion Engine Concepts", an ISS White Paper, Jun. 30, 1999, pp. 1-23.
SpinRite 5.0, Gibson Research Corp, http://www.grc.com/default.htm, 2000, two pages; See advertisement addressing sub-pixel font rendering on first page.
Advanced Virus Detection Technology for the Next Millennium, Aug. 1999, Network Associates, A Network Associates Executive White Paper, pp. 1-14; See page 6, Figure 1.

* cited by examiner

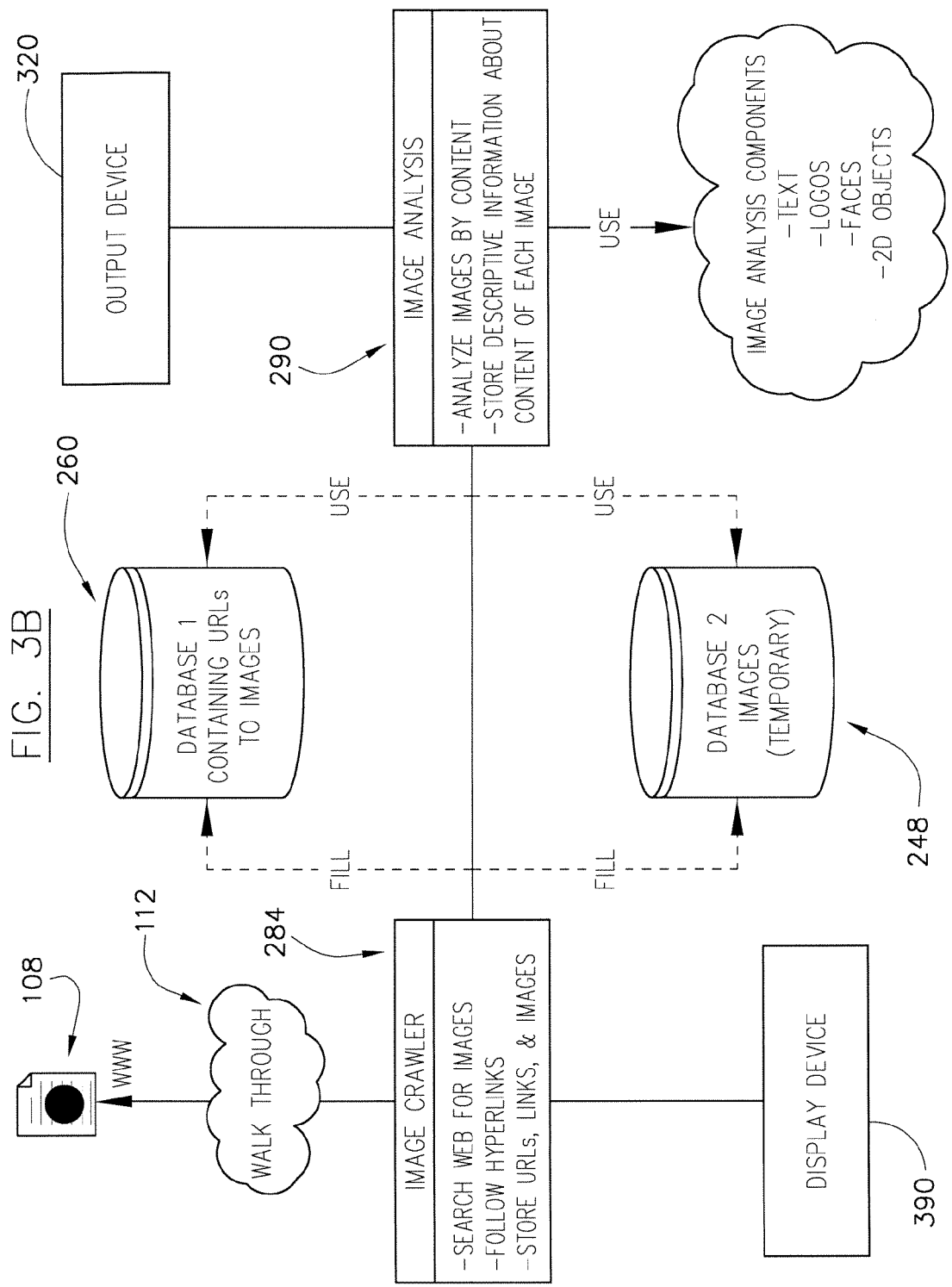

tshirt.jpg (id=970729)

FIG. 18
Logo to search for (id=10001)

SYSTEM AND METHOD FOR COMPILING IMAGES FROM A DATABASE AND COMPARING THE COMPILED IMAGES WITH KNOWN IMAGES

This application is a continuation of and claims priority under 35 U.S.C. §120 to application Ser. No. 09/746,453 filed Dec. 21, 2000, now U.S. Pat. No. 7,130,466, entitled "System and Method for Compiling Images from a Database and Comparing the Compiled Images with Known Images," the entire contents of which are incorporated by reference.

BACKGROUND OF THE INVENTION

1. Field of the Invention

This invention relates generally to computer networks. More particularly, this invention provides for a system and method for searching and compiling from a database, such as the Worldwide Internet, images that have a specified visual content, and for determining if any of the compiled images are substantially similar to one or more known images.

2. Description of the Background Art

In its embryonic stage the Worldwide Internet provided a research-oriented environment where users and hosts were interested in a free and open exchange of information, and where users and hosts mutually trusted one another. However, the Internet has grown dramatically, currently interconnecting over 100,000 computer networks and several million users. Because of its size and openness, the Internet has become a target of trademark and service mark infringement or misuse. Virtually every trademark or service mark is available for unauthorized use on the Internet. Before connecting, companies balance the rewards of an Internet connection against risks of infringement of trademarks and servicemarks.

An entity's brands, trademarks, or servicemarks may be its most valuable asset. This is especially true with global intellectual property such as brands, trademarks, or servicemarks where integrity of the brand, trademark or servicemark is vital in new markets. Unfortunately, piracy of such intellectual property in many of these markets already costs leading corporations billions of dollars in lost sales annually, including new forms of piracy on the Worldwide Internet. Brand images (or look-alike marks) can be surreptitiously posted on web pages for selling fraudulent or unauthorized goods to a global market. If the presence of any brand, trademark or servicemark on the Internet becomes compromised, the result can be dilution of such any brand, trademark or servicemark, and ultimate loss of market share.

In the Worldwide Internet the number of web sites and the number of images increases daily by millions. Right now, there are expected to be more than 500 million images in the Internet. While searching for regular text in the Internet is known (e.g., commercial text search engines like Yahoo, Altavista, Lycos, etc.), searching solely for images is much more difficult. Presently, searching for images in the Internet is possible only by looking at an image name, e.g., "Clinton.gif," or by looking at the text grouped around an image in a website (e.g., commercial sites like "richmedia.lycos.com," Altavista image finder, etc.). It is believed that there is presently no feasible system to efficiently search for images in the Internet by specifying their visual content, because no computer system or computer method is presently available to detect the specified visual content of an image from all of the millions of images provided in the Internet.

Therefore, what is needed and what has been invented is a system and method for searching and compiling from a database, such as the Worldwide Internet, images that have a specified visual content, and for determining if any of the compiled images are substantially similar to one or more known images. What has been more specifically invented is a high-precision, automated visual detection service to protect global trademarks, servicemarks, and brands from infringement, dilution, or tarnishment by look-alike or imposter marks and brands on the Internet. The visual detection technology provided by the present invention finds a brand, trademark, or servicemark on Internet web pages, and also finds designs, symbols, shapes, and signs that closely resemble the brand, trademark or servicemark. The present invention also identifies logos within a larger picture and text within images.

SUMMARY OF THE INVENTION

The present invention broadly provides a system and method for searching and discovering from a database (e.g., the Worldwide Internet) an object (e.g. a logo, a trademark, etc.) which is confusingly similar with a known object. Broadly, an object crawler sweeps websites of the Internet by automatically following hyperlinks contained in the websites. On each website the object crawler identifies all objects and duplicates them by downloading them on servers of a temporary storage system. Broadly further, after the object are downloaded by the object crawler and stored on the servers of the temporary storage system, the visual content of the objects may be analyzed, such as by hundreds of parallel computers analyzing object content. This may be done in a massive parallel manner with hundreds of computers (e.g., three hundred computers or more). Each computer object operates an object analysis software component which processes one or more input objects and produces as output descriptive information in terms of text and numbers about what content is in the object(s). For each object the following information may be produced and stored: object size; "fingerprint" for efficient identification of substantial similar objects; all text contained in the object(s); "fingerprint" of each face contained in the object(s); information about the logos/trademarks contained in the object(s); and information about things and images contained in the object(s).

In one embodiment of the present invention, a graphical user interface is provided where the user may enter search criteria for the object to be searched. The search criteria to be entered in the graphical user interface may include one or more of the following search criteria: (i) one or more text strings that may be contained in the object including any image; (ii) one or more logo, trademarks or servicemarks selected from a list of predefined logos, trademarks or servicemarks that may be contained in the object including any image; (iii) one or more things or physical features or shapes selected from a list of predefined logos, trademarks or servicemarks that may be contained in the object including any image; (iv) one or more faces of facial templates that may be contained in the object including any image; and (v) one or more images that look substantially similar.

In another embodiment of the present invention, a system and method is provided for searching for an entity's logos, trademarks or servicemarks in objects and images in the Worldwide Internet. A known logo and/or trademark and/or servicemark is provided and is entered into the system of the present inventions; and the content of each object in the internet is compared with the known logo and/or trademark and/or servicemark to determine if there is any confusing similarity. If a confusingly similar logo and/or trademark and/or servicemark appears in the internet object, a reference to the internet object is stored as search results. After scrutinizing objects in the internet, the user may access the search results.

In yet another embodiment of the present invention, a system and method is provided for searching for faces of people or animals that are substantial identical to a known face. The system and method of embodiments of the present invention accept as input an object (e.g., a scanned photograph) that contains at least one face. Subsequently, the input face is compared with all faces in the internet objects (including images) using already computed face "fingerprints" available in storage. The result of the comparison is output in the form of a list of substantial identical objects (including images) that contain a face that is similar or substantially identical to the input face.

Embodiments of the present invention more specifically provide a method for discovering from a database (e.g., the Worldwide Internet) an object which is confusingly similar with a known object comprising: (a) searching (e.g. searching with a web crawler by following hyperlinks contained in web site elements) a database for objects; (b) providing a known object; and (c) determining if any object from the database is confusingly similar with the known object. The method preferably additionally comprises duplicating the objects from the database to produce duplicated objects; storing the duplicated objects to produce stored duplicated objects; and determining if any stored duplicated object is confusingly similar with the known object. The method further preferably additionally comprises determining the degree of similarity of any stored duplicated object with the known object. The objects may be selected from the group consisting of graphic images, videos, audio sounds and mixtures thereof. Each of the objects may be an intellectual property selected from the group consisting of logos, trademarks, service marks, and mixtures thereof. Determining if any object is confusingly similar with the known object further preferably comprises determining if all of the necessary metadata is available for any of the stored duplicated objects; and if not, the necessary metadata is developed for the stored duplicated objects. Determining if any object is confusingly similar with the known object further preferably comprises performing one or more of the following process steps: conducting an optical character recognition analysis on the object; conducting a facial analysis on the object; conducting a watermark analysis on the object; conducting a signature analysis on the object; and conducting an object similarity analysis on the object.

Embodiments of the present invention also more specifically provide a method comprising accessing a store that is storing duplicated objects from a database (e.g., an Internet database); and determining if any of the duplicated objects stored in the store are similar with a known object.

Embodiments of the present invention further also more specifically provide a computer-readable storage medium storing program code for causing a processing system to perform the steps of: searching a database for objects; duplicating the objects from the database to produce duplicated objects; storing (e.g., maintaining in memory or transferring into memory) the duplicated objects to produce stored duplicated objects; determining if any stored duplicated object is confusingly similar with a known object.

Embodiments of the present invention also provide for a system for discovering from a database an object which is confusingly similar with a known object comprising: a search engine for searching a database for objects; a duplicator coupled to the search engine for duplicating objects from the database to produce duplicated objects; a store coupled to the duplicator for storing the duplicated objects to produce stored duplicated objects; and determining means, coupled to the store, for determining if any stored duplicated object is confusingly similar with a known object. The system additionally preferably comprises determining the degree of similarity of any stored duplicated object with the known object.

The present invention further also provides a system for discovering from a database an object which is confusingly similar with a known object comprising: means for searching a database for objects; means for duplicating objects from the database to produce duplicated objects; means for storing the duplicated objects to produce stored duplicated objects; and means for determining if any stored duplicated object is confusingly similar with a known object. The system additionally preferably comprises means for determining the degree of similarity of any stored duplicated object with the known object.

The present inventions also provides a method for determining a degree of similarity between a known object and an object duplicated from a database comprising: duplicating an object from a database to produce a duplicated object; analyzing the content of the duplicated object (e.g., by assigning numbers for each pixel in the duplicated object) to produce a matrix of numbers; producing a model template from a known object; and comparing the model template of the known object with the matrix of numbers to determine the degree of similarity between the duplicated object and the known object. The method for determining a degree of similarity between a known object and an object duplicated from a database preferably additionally comprises one or more of the following process steps: providing a threshold degree of similarity to set a standard for confusingly similarity between the known object and the duplicated object; displaying the degree of similarity if the degree of similarity is at least equal to the threshold degree of similarity; and determining what region of the object the known object is located. The matrix of numbers is created in a RAM when the object (or image) is loaded from storage. The model template is computed and/or created automatically when the first search for object (e.g., a logo) is executed. The model template may be stored in a RAM. Each pixel consists of three numbers representing red, green, and blue. Color depends on algorithms. For example, in object or image searching, the colored image is converted into a grayscale image; subsequently, the actual analysis (or object/image detection) is performed on the grayscale image.

The foregoing provisions along with various ancillary provisions and features which will become apparent to those skilled in the art as the following description proceeds, are attained by the practice of the present invention, a preferred embodiment thereof shown with reference to the accompanying drawings, by way of example only, wherein:

BRIEF DESCRIPTION OF THE DRAWINGS

FIG. 3B is a schematic diagram of a web crawler coupled to the Internet and to an object analyzer and storage device;

FIG. 18 is a pictorial of a known image that was used in Example II to determine if any of the images contained in object storage device were substantially similar to the known image.

DETAILED DESCRIPTION OF PREFERRED EMBODIMENTS

The following description is provided to enable any person skilled in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
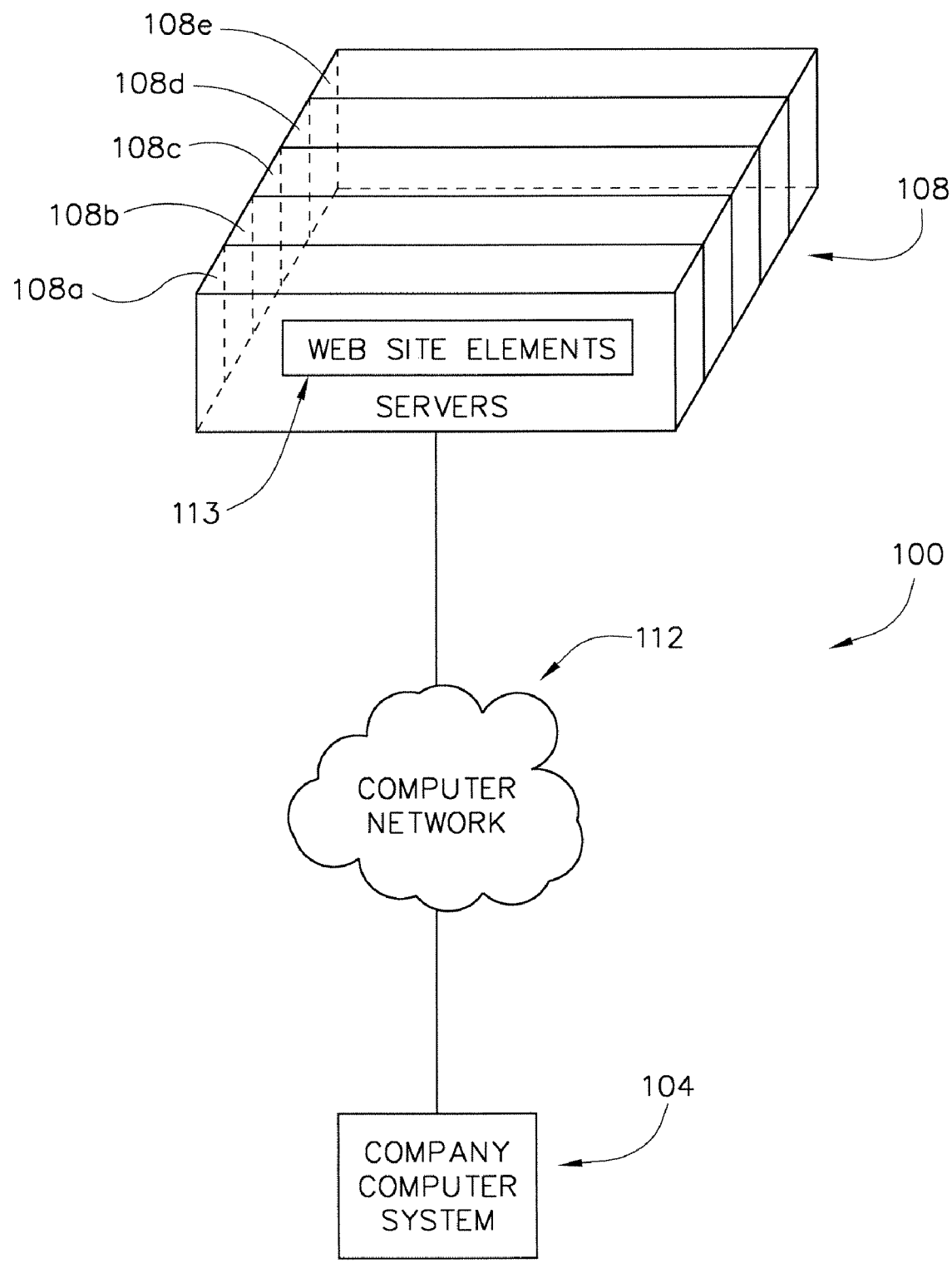
FIG. 1 is a block diagram illustrating a user network access system in accordance with the present invention.

Referring now to FIG. 1 there is seen a block diagram illustrating an exemplary user network access system, generally illustrated as 100, in accordance with various embodiments of the present invention. System 100 includes a company computer system, generally illustrated as 104, a plurality of servers, generally illustrated as 108, and an interconnected networks of computers ("Internet") generally illustrated as 112, for coupling the company computer system 104 to the plurality of servers 108 which include a plurality of web site elements, generally illustrated as 113. The servers 108 may include any number of servers, such as servers 108a, 108b, 108c, and 108d. The plurality of web site elements 108 represent web site elements for each server 108a, 108b, 108c, and 108d. Each server 108a, etc, and its associated web site elements 108 are typically coupled to a respective computer (not shown) via an internal network signal bus (not shown), and represents a respective possessor or owner of a web page system for advertisement, informational purposes, services, etc., on the Internet 112. Exemplary advertisement, informational purposes, and services include promotional services, sales information, biographical information, e-mail service programs, address book service programs, calendar service programs, paging service programs, and company database service programs, etc., all of which may include audio sounds, videos, and one or more graphic images (e.g., a reproduction or imitation of a design and text or words including a reproduction or imitation of a person, a thing, a mark, or a symbol) including logos (e.g. non-word elements, a design such as graphic designs, etc), trademarks (e.g., a word, symbol or device pointing distinctly to the origin or ownership of merchandise to which it is applied and legally reserved to the exclusive use of the owner as maker or seller), service marks (e.g. a mark or device used to identify a service offered to customers), faces of people, 2-dimensional objects like animals and cars, etc., all of which may be nonexclusively referred to as "objects." Thus, "objects" comprise images, videos, audio sounds, and the like. If the user of the company computer system 104 wants to access one of the services of one of the servers 108, the user applies a known Uniform Resource Locator (URL) to access a web page operated by the possessor of server whose services are to be accessed.

Figure 2:
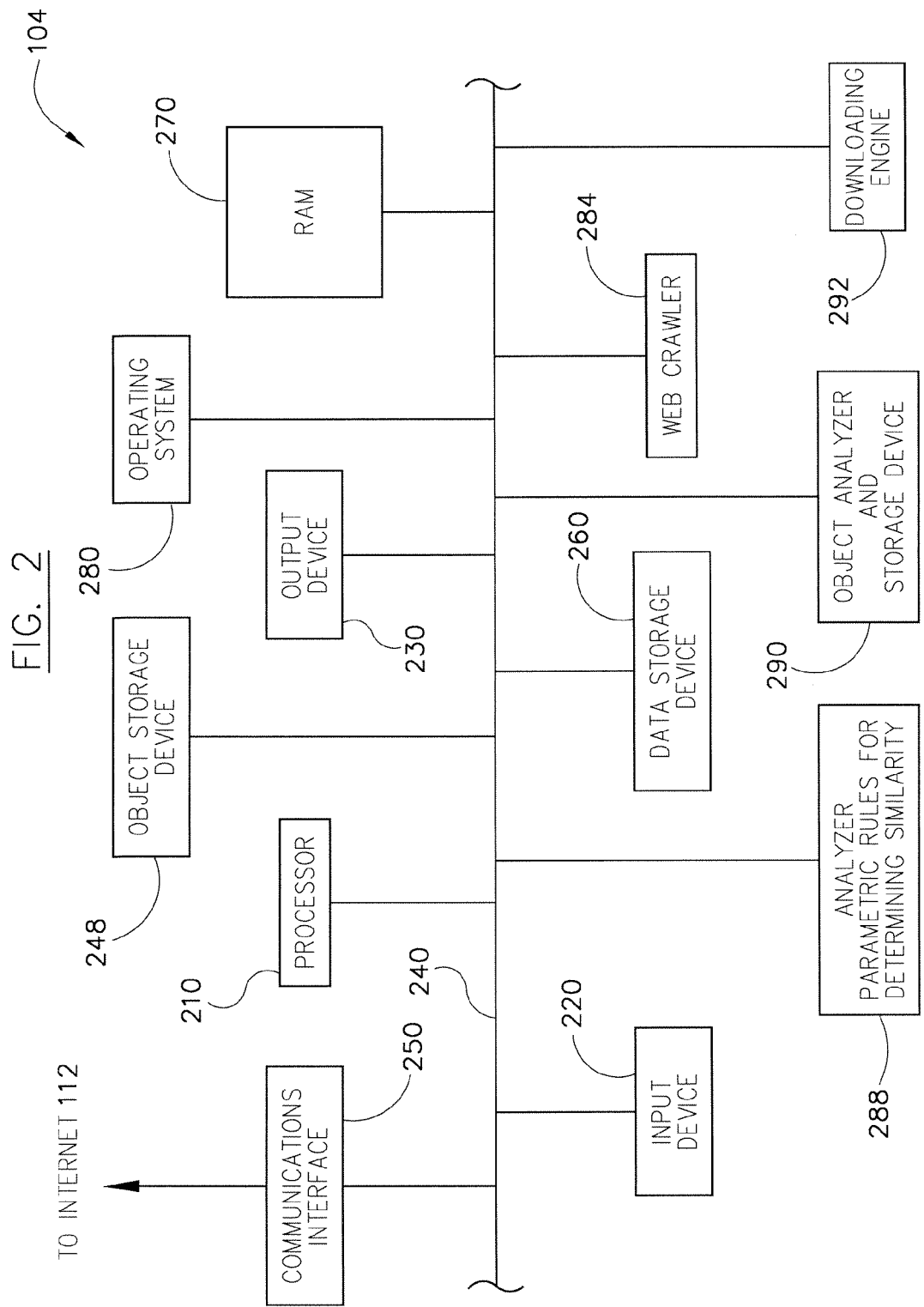
FIG. 2 is a block diagram illustrating details of a company computer system.

Referring now to FIG. 2 there is seen a block diagram illustrating details of the company computer system 104. The computer system 104 includes a processor 210 (e.g., a Central Processing Unit) such as a Motorola Power PC® microprocessor or an Intel Pentium® microprocessor. An input device 220, such as keyboard and mouse, and an output device 230, such as a Cathode Ray Tube (CRT) display, are coupled via a signal bus 240 to processor 210. A communications interface 250, a data storage device 260, such as Read Only Memory (ROM) or a magnetic disk, and a Random-Access Memory (RAM) 270 are further coupled via signal bus 240 to processor 210. The communications interface 250 of the computer system 104 is coupled to the Internet 112 as shown in and described with reference to FIG. 1. The computer system 104 also includes an operating system 280, a web crawler 284, an object storage device 248, analyzer parametric Rules 288 for determining similarity, object analyzer and storage device 290, and a downloading engine 292.

Figure 3A:
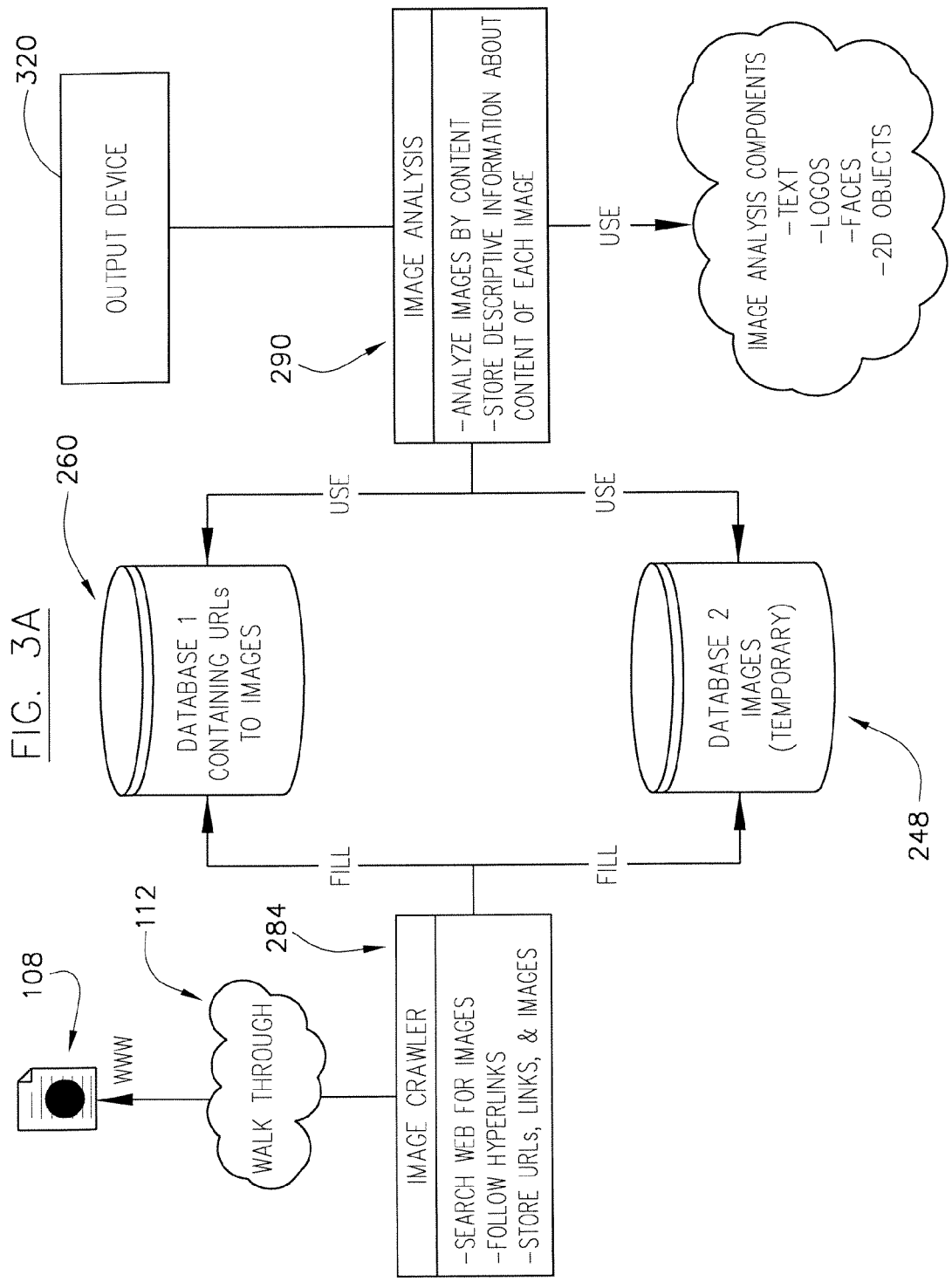
FIG. 3A is a schematic diagram of a web crawler coupled to the Internet and its associated servers and further coupled to an object analyzer and storage device.

Referring now to FIG. 3A there is seen a schematic diagram of the web crawler 284 coupled to the Internet 112 (including the servers 108), and to both the data storage device 260 and the object storage device 248 which latter both in turn are coupled to the object analyzer and storage device 290. As schematically illustrated in FIG. 3A, the web crawler 284 "walks through" the Internet 112 and sweeps the servers 108, searching for web objects including images, by automatically following hyperlinks contained in the respective web site elements 113. It is to be understood that the web crawler 284 may go to any web site, including specified web sites that are not linked (e.g., top level domains (TLD)). The web crawler 284 may also temporarily store URLs, hyperlinks, and copies of objects. An object transfer engine (identified below as "440" and "550") may then respectively transfer the web objects and the URLs of the objects to data storage device 260 and to object storage device 248. Each object contains pixels (e.g. 10,000 or more pixels) and numbers are assigned to each pixel when the object is being analyzed by content. As will be explained below, there are two embodiments for the web crawler 284. The object analyzer and storage device 290 are coupled to a display or output device 320 and includes the analyzer parametric Rules 288 for determining similarity and the downloading engine 292 for downloading the web objects and the URLs from the data storage device 260 and the object storage device 248, respectively. As will be also explained below, there are also two embodiments for the object analyzer and storage device 290 wherein web objects may be analyzed and wherein descriptive information about the content of each web object may be stored. As previously indicated, object analyzer and storage device 290 analyzes web objects by number of pixels in each web object and assigns numbers for each pixel and stores the numbers (i.e., the descriptive information about content of each object). Each pixel consists of three (3) numbers representing the colors red, green, and blue. In FIG. 3B the web crawler 284 is coupled directly to the object analyzer and storage device 290, instead of being coupled to the object analyzer and storage device 290 via object storage device 248 and data storage device 260. The web crawler 284 in FIG. 3B is also coupled to a display device 390. Image or object analysis components employed by the analyzer 290 for each object include, but is not limited to, text (e.g. words and the like), logos, faces (e.g., both human and animal faces, and the like), and two dimensional objects or things (e.g., cars, planes, animals, and the like), and combinations thereof.

Figure 4:
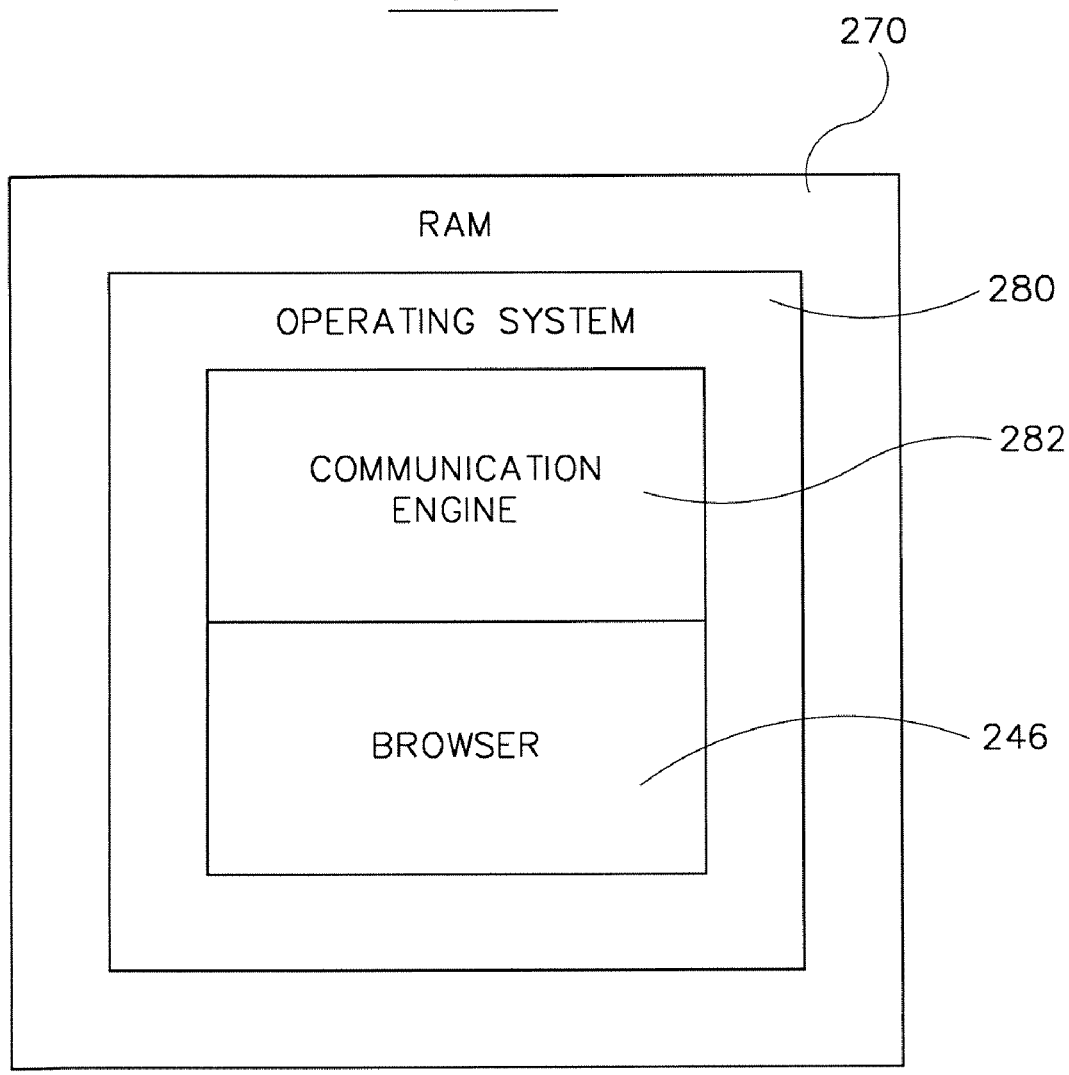
FIG. 4 is a block diagram of a RAM device including an operating system, a communication engine, and a browser.

The operating system 280 has a program for controlling processing by processor 210, and may be stored at any suitable location (e.g., in object storage device 260) and is loaded by the downloading engine 282 into RAM 270 for execution (see FIGS. 2 and 4). As best shown in FIG. 4, operating system 280 includes or controls a communication engine 282 for generating and transferring messages including objects to and from the Internet 112 via the communications interface 250. Operating system 280 further includes or controls an internet engine such as a web browser 246, e.g., the Netscape™ web browser produced by Netscape, and the Internet Explorer™ web browser produced by the Microsoft Corporation. The web browser 246 may comprise an encryption or decryption engine (not shown in the drawings for encrypting or decrypting messages). The browser 246 further receives web page data including web objects and/or other desired information. The web browser 246 enables a user of the computer system 104 to receive objects including images from the servers 108 via the Internet 112.

One skilled in the art will recognize that the system 100 may also include additional information, such as network connections, additional memory, additional processors, Local Area Networks (LANs), input/output lines for transferring information across a hardware channel, the Internet 112 or an intranet, etc. One skilled in the art will also recognize that the programs and data may be received by and stored in the system in alternative ways. For example, a computer-readable storage medium (CRSM) reader such as a magnetic disk drive, hard disk drive, magneto-optical reader, CPU, etc. may be coupled to the signal bus 240 for reading a computer-readable storage medium (CRSM) such as a magnetic disk, a hard disk, a magneto-optical disk, RAM, etc. Accordingly, the system 100 may receive programs and data via a CRSM reader. Further, it will be appreciated that the term "memory" herein is intended to cover all data storage media whether permanent or temporary. Therefore, it will be apparent to those skilled in the art that several variations of the system elements are contemplated as being within the intended scope of the present invention. For example, given processor and computer performance variations and ongoing technological advancements, hardware elements (e.g., multiplexers, etc.) may be embodied in software or in a combination of hardware and software. Similarly, software elements may be embodied in hardware or in a combination of hardware and software. Further, while connection to other computing devices may take place at output device 230 or communications interface 250, wired, wireless, modem and/or connection or connections to other computing devices (including but not limited to local area networks, wide area networks and the Internet 112) might be utilized. A further example is that the use of distributed processing, multiple site viewing, information forwarding, collaboration, remote information retrieval and merging, and related capabilities are each contemplated. Various operating systems and data processing systems can also be utilized, however at least a conventional multitasking operating system such as Windows95® or Windows NT® (trademarks of Microsoft, Inc.) running on an IBM® (trademark to International Business Machines, Inc.) compatible computer is preferred and will be presumed for the discussion herein. Input device 220 can comprise any number of devices and/or device types for inputting commands and/or data, including but not limited to a keyboard, mouse, and/or speech recognition.

Figure 5:
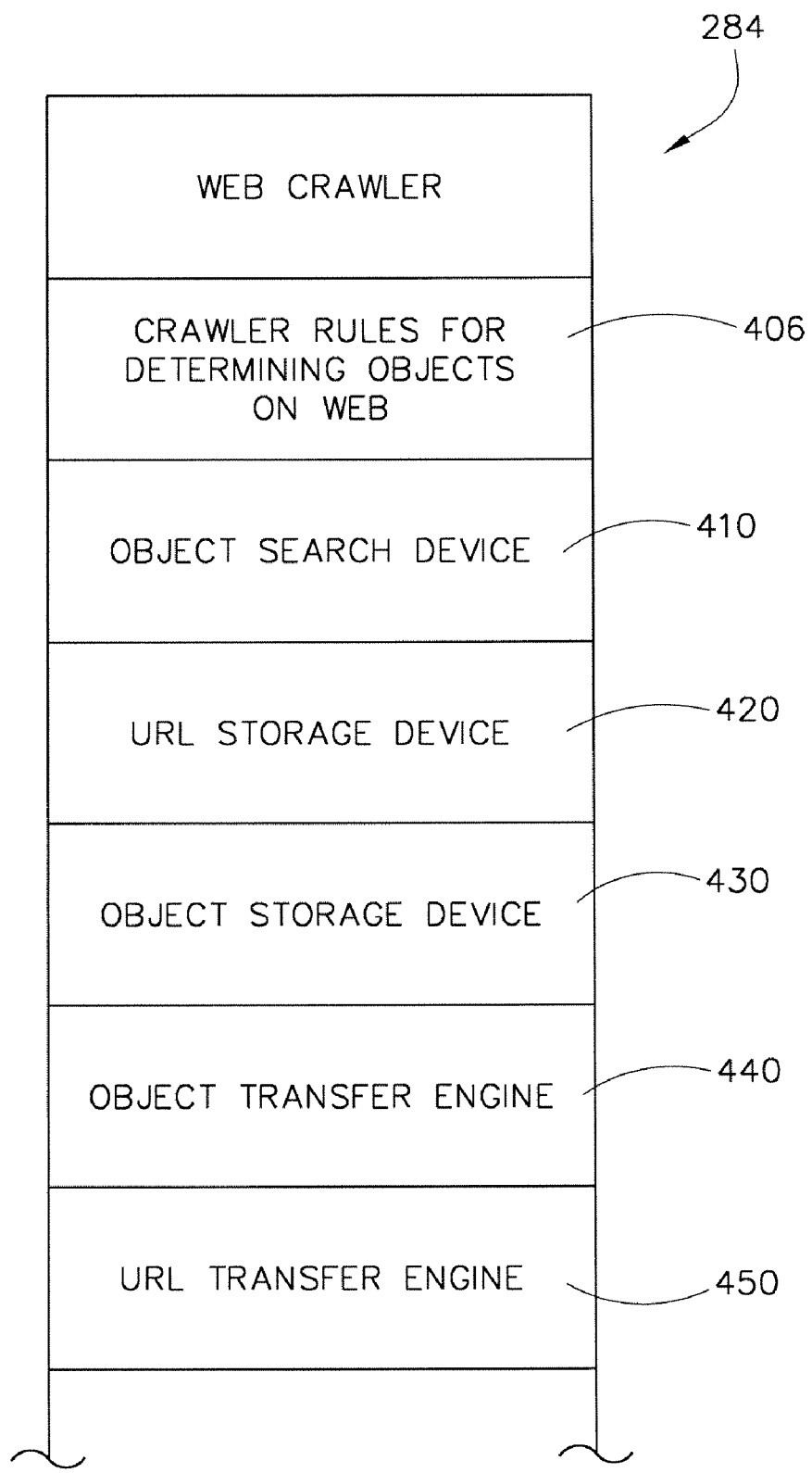
FIG. 5 is a block diagram for an embodiment of the web crawler.
Figure 6:
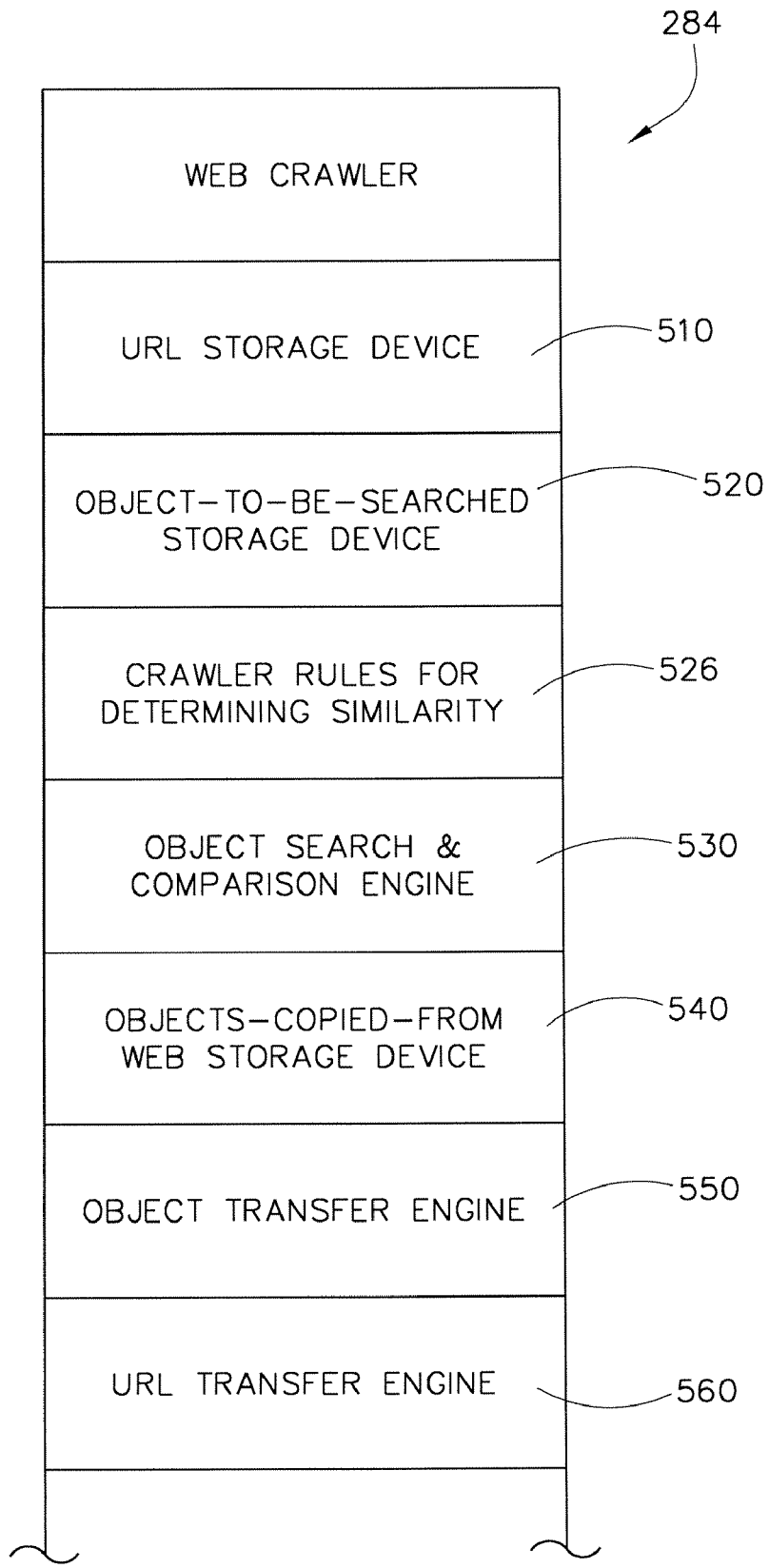
FIG. 6 is a block diagram for another embodiment of the web crawler.

The web crawler 284 of the present invention sweeps or "walks through" the Internet 112 including servers 108 by automatically following hyperlinks contained in the respective web site elements 113, or by going to specific web sites that are not linked, such as top level domains (TLD). The web crawler 284 on each web site identifies all web objects and duplicates or copies them from the servers 108 and Internet 112. FIGS. 5 and 6 represent two respective embodiments for the web crawler 284. Referring to FIG. 5, there is seen one embodiment of the web crawler 284 as including crawler Rules 406 for determining or identifying web objects on the web, an object search engine 410 for searching all of the servers 108 for web objects in accordance with the crawler Rules 406, a URL storage device 420 for storing Uniform Resource Locators for each of the web sites, and an object storage device 430 for receiving and temporarily storing web objects that have been identified by the web crawler 284 in accordance with the crawler Rules 406. The web crawler 246 of FIG. 5 may also include an object transfer engine 440 for transferring the stored web objects from the object storage device 430 to an object data base, such as web object storage device 248, as well as a URL transfer engine 450 for transferring Uniform Resource Locators from URL storage device 420 to a URL data base, such as data storage device 260. The web crawler 284 of FIG. 5 continually monitors the entire Internet 112 including the servers 108 for any and all web objects. Thus, this embodiment of the web crawler 284 continually scavenges the Internet 112 including the servers 108 coupled thereto for any and all web objects without making any discernment as to substantial similarity between any object on the Internet 112 and/or servers 108 and any known object.

Referring now to FIG. 6, there is seen another embodiment of the web crawler 284. This embodiment of the web crawler 284 includes a URL storage device 510 for storing Uniform Resource Locators for each of the web sites, and an object-to-be-searched storage device 520 which receives and stores web objects that are to be searched on the Internet 112 and servers 108 by the web crawler 284. The user of this embodiment of the web crawler 284 enters or inputs the desired known objects into the object-to-be searched storage device 520 whose substantially similarity is to be searched for on the Internet 112 and servers 108. This embodiment of the web crawler 284 also includes crawler Rules 526 for determining substantial similarity between the known object(s) stored in the object-to-be searched storage device 520 and any web objects discovered on the Internet 112 and/or servers 108. The web crawler 284 of FIG. 6 further also includes an object search and comparison engine 530, an objects-copied-from-web storage device 540, an object transfer engine 550 and a URL transfer engine 560. The object search and comparison engine 530 searches in accordance with crawler Rules 526, the Internet 112 and servers 108 for known objects that are stored in the object-to-be-searched storage device 520. The engine 530 also compares in accordance with the crawler Rules 526 each web object found on the Internet 112 and/or servers 108 with each known object stored in the object-to-be-searched storage device 520; and if there is a substantial similarity in accordance with the crawler Rules 526, the engine 530 downloads (i.e., duplicates or copies) the substantially similar web object(s) off of the Internet 112 and servers 108 into the objects-copied-from-web storage device 540. The object transfer engine 550 duplicates and transfers the substantially similar web object(s) from the objects-copied-from-web storage device 540 to a data base, such as object storage device 248. The URL transfer engine 450 transfers Uniform Resource Locators from URL storage device 510 to a URL data base, such as data storage device 260. The web crawler 284 of FIG. 6 selectively searches the Internet 112 including the servers 108 for any web objects that are substantially similar to the known object(s) stored in the object-to-be-searched storage device 520. Thus, for this embodiment of the invention including the web crawler 284, the web crawler 284 scavenges the Internet 112 and the servers 108 with discernment, looking for any and all web objects that are substantially similar to any and all known objects stored in the object-to-be-searched storage device 520.

Figure 7:
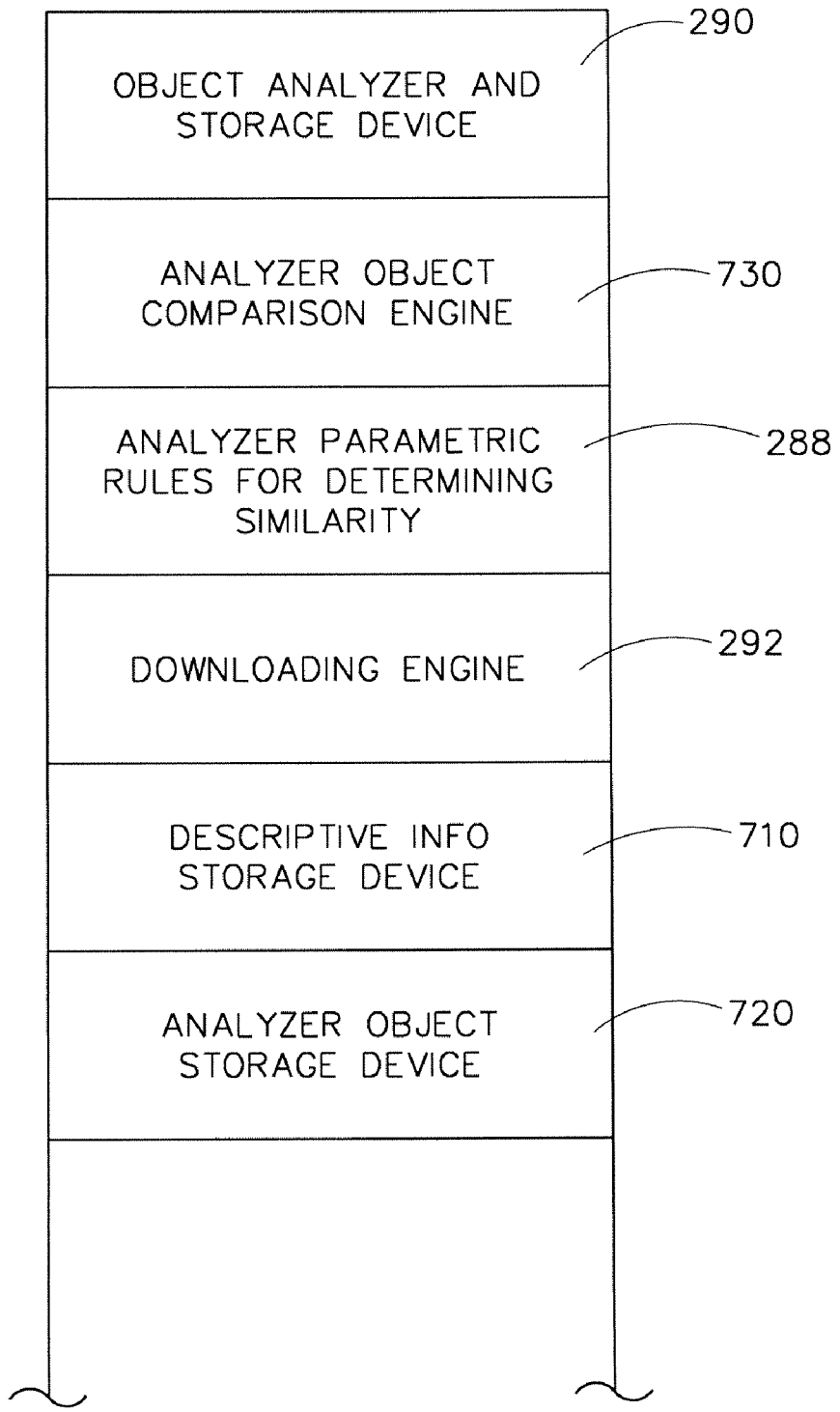
FIG. 7 is a block diagram for an embodiment of the object analyzer and storage device.
Figure 8:
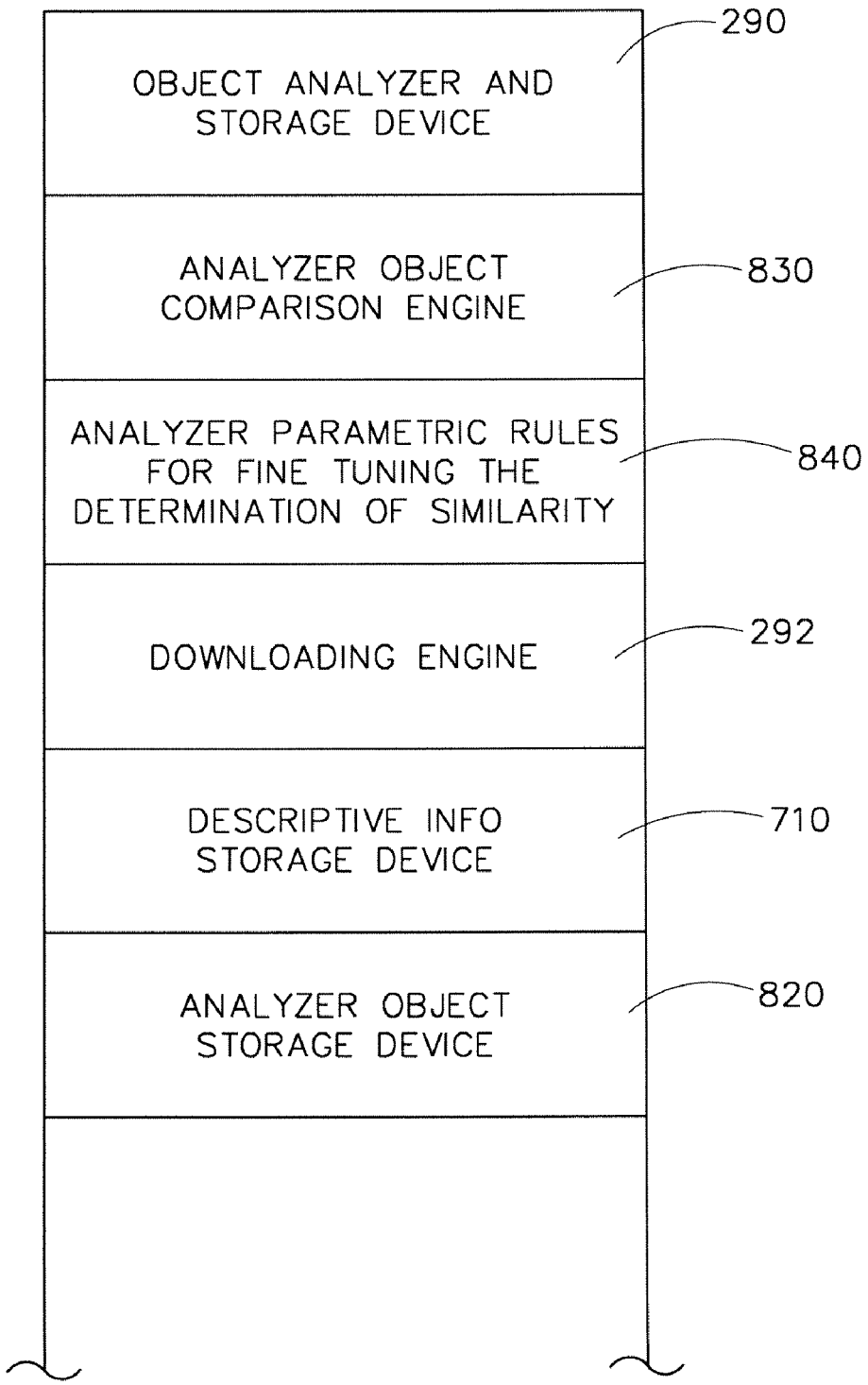
FIG. 8 is a block diagram for another embodiment of the object analyzer and storage device.

Referring in detail now to FIG. 7 and FIG. 8, there is seen two respective embodiments for the object analyzer and storage device 290. Referring now to FIG. 7, there is seen one embodiment of the object analyzer and storage device 290 as including the analyzer parametric Rules 288 for determining similarity, an analyzer object comparison engine 730, the downloading engine 292, and a descriptive information storage device 710. The descriptive information storage device 710 contains descriptive information (i.e., mathematical model templates) about one or more known objects for making a determination if the known objects are substantially similar to any of the web objects that were duplicated or copied from the Internet 112 or servers 108 by the web crawler 284. The analyzer parametric Rules 288 for determining similarity are the rules and parameters that the object analyzer and storage device 290 employs to determine if there is substantial similarity between the descriptive information pertaining to the known objects stored in the descriptive information storage device 710 and the web objects, more specifically the information on the web objects, which is stored in the object storage device 248 after being removed or extracted from the Internet 112 and/or servers 108. The web-copied or web-duplicated web objects are subsequently either initially stored in object storage device 430, or in the objects-copied-from-web storage device 540, or the web-copied web objects by-pass these crawler storage sections and are loaded directly into the object storage device 248. The downloading engine 297 is capable of downloading web objects (including associated descriptive information on web objects) and URLs from object storage device 248 and data storage device 260, respectively, into the object analyzer and storage device 290, more specifically into the analyzer object storage device 720 of the object analyzer and storage device 290 where the downloaded information is converted into a plurality of numbers from the number of pixels in each web object. As was previously indicated, each pixel in an object is given particular numbers producing a set of numbers which are compared with the mathematical model template of the known object for determining a degree of similarity. Each pixel consists of three (3) numbers representing the colors red, green, and blue. Alternatively, a separate downloading engine (not shown) is employed for downloading URLs from the data storage device 260 into the analyzer object storage device 720 of the object analyzer and storage device 290.

Once the downloaded web objects and their associated descriptive information arrives in the analyzer object device 720, the analyzer object comparison engine 730, under the aegis of the analyzer parametric Rules 288 for determining similarity, makes a comparison between the downloaded web objects (including their associated descriptive information which is in the form of a matrix of numbers from pixels) and the descriptive information (i.e., a template such as a mathematical model template) concerning one or more known objects in the descriptive information storage device 710. Depending on the degree of substantial similarity, which depends on the analyzer parametric Rules 288, a match is made between one or more of the downloaded web objects and one or more of the known objects. This information including the corresponding URL(s) for the downloaded web objects may then be provided or displayed through any suitable output device 320, including a printer or video screen or any of the like. Based on the analyzer parametric Rules 288, or the analyzer parametric Rules 288 in combination with the analyzer object comparison engine 730, the degree of similarity may also be provided or displayed. By way of example only, if one or more of the downloaded objects are 90% similar to one or more known objects, such 90% degree of similarity is also provided or displayed. Thus, the analyzer parametric Rules 288, or the analyzer parametric Rules 288 in combination with the analyzer object comparison engine 730, enable the degree of similarity between downloaded web objects and known objects to be determined. Typical degree of similarity would be 100%, 95%, 90%, 85%, 80%, or any suitable degree of similarity that is desired. As was previously mentioned, the degree of similarity is preferably determined by comparing a mathematical model template of the known object with a matrix of numbers generated from the number of pixels in each web object, with each pixel consisting of three numbers representing the colors red, green, and blue. The manner in which color in an object or image is addressed depends on each algorithm. For example, in the logo search exemplified in FIG. 13, a colored image is converted into a grayscale image; then the actual analysis/logo detection is performed on the grayscale image. The matrix of numbers is computed in a RAM, such as RAM 270, when the object or image is loaded from storage, such as storage device 248.

Referring now to FIG. 8, there is seen another embodiment of the object analyzer and storage device 290 as including analyzer object comparison engine 830, and an (optional) analyzer parametric Rules 840, preferably for "fine tuning" or tweaking any determination of similarity made by the web crawler 284, more specifically the web crawler 284 of FIG. 6. The analyzer parametric Rules 840 may be optional in the sense that analyzer parametric Rules 840 may not be needed if the crawler Rules 526, or if the crawler Rules 526 in combination with the object search and comparison engine 530, are sufficient enough such that the web objects stored in the objects-copied-from-web storage device 540 has the desired degree of similarity with the known objects stored in the object-to-be-searched storage device 520. In such a case the web-copied or web-duplicated web objects may be displayed through the output or display device 390 (see FIG. 3B), such as any suitable printer and/or video screen or the like. The crawler Rules 526, or the crawler Rules 526 in combination with the comparison engine 530, like the analyzer parametric Rules 288 or the analyzer parametric Rules 288 in combination with the analyzer object comparison engine 830, may also furnish the degree of similarity between web objects in the objects-copied-from-web storage device 540 and the known objects in the objects-to-be-searched storage device 520. If the crawler Rules 526, or if the crawler Rules 526 in combination with the object search and comparison engine 530, are not sufficient for providing a desired degree of similarity (e.g., 100% or 95% degree of similarity), then the analyzer parametric Rules 840, or the analyzer parametric Rules 840 in combination with the comparison engine 830, would be employed for "fine tuning" or tweaking the determination of similarity determined by the crawler 284 of FIG. 6, more specifically by the crawler Rules 526, or by the crawler Rules 526 in combination with the object search and comparison engine 530, of FIG. 6. Thus, if the degree of similarity detected by the crawler 284 of FIG. 6 is say 50%, then the object analyzer and storage device 290 of FIG. 8, may be used to "fine tune" or tweak this 50% degree of similarity to produce a more sufficient degree of similarity. More specifically, the analyzer parametric Rules 840, or the analyzer parametric Rules 840 and the comparison engine 830 in combination with the information contained in the descriptive information storage device 710, for the object analyzer and storage device 290 of FIG. 8 would be employed to produce a higher degree of similarity (e.g., 90%) between the web object(s) and the known object(s).

The object analyzer and storage device 290 of FIG. 8 may also (optionally) include the downloading engine 292. If the embodiment of the invention in FIG. 3B is employed such that the web crawler 284 is coupled directly to the object analyzer and storage device 290, instead of being coupled via object storage device 248 and data storage device 260, the downloading engine 292 would not be necessary as the object transfer engine 550 of the web crawler could directly transfer any web objects recovered from the Internet 112 and the servers 108 to the analyzer object storage device 820. The object analyzer and storage device 290 of FIG. 8 also has the descriptive information storage device 710 and an analyzer object storage device 820 which functions comparably to the analyzer object storage device 720.

Figure 9:
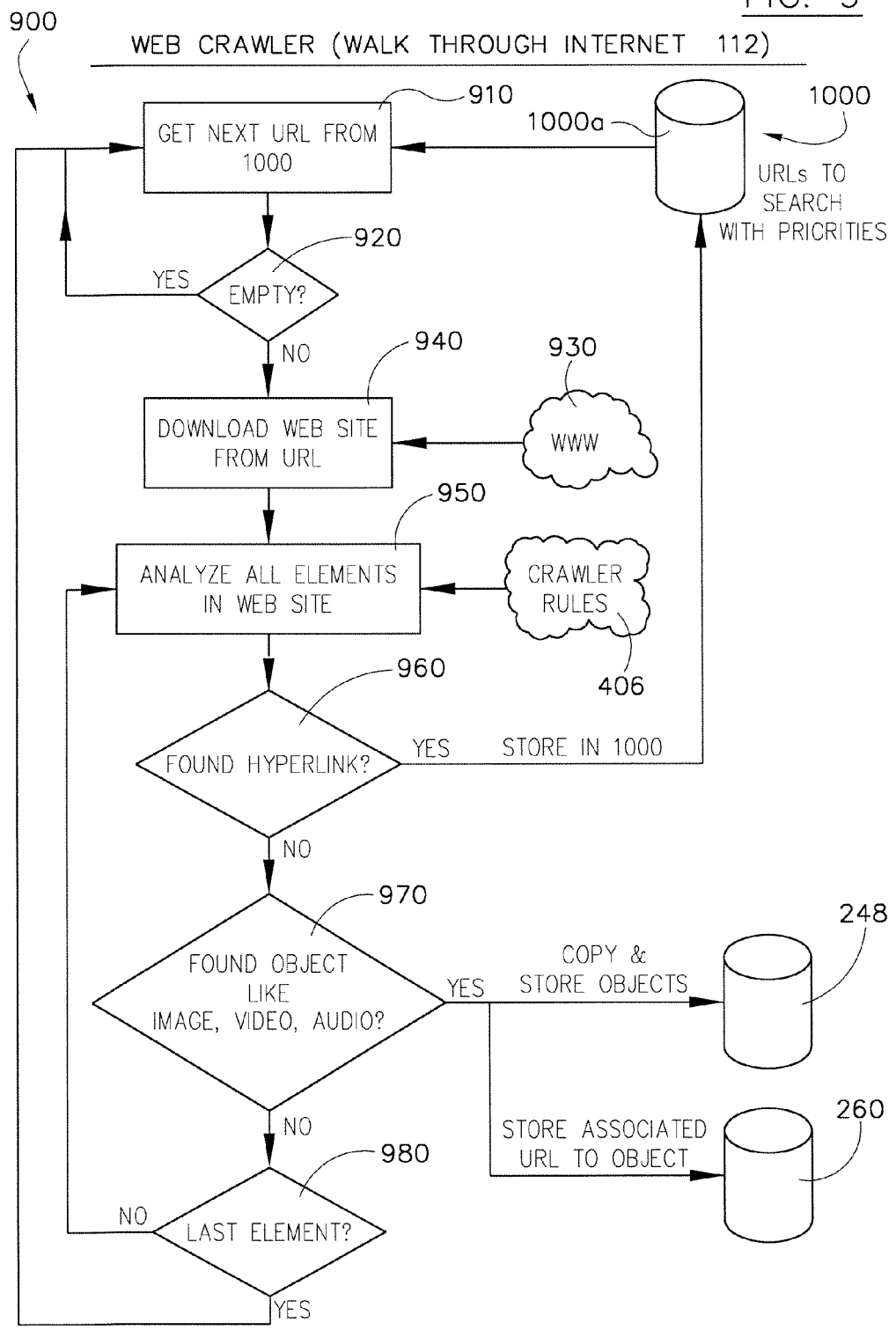
FIG. 9 is a flowchart in accordance with an embodiment of the invention broadly illustrating a method for sweeping or canvassing a database, such as the Worldwide Internet, for detecting, duplicating, and storing objects (e.g., images, videos, and audio sounds)

Referring now to FIG. 9, there is seen a flowchart for broadly illustrating a method 900 for sweeping or canvassing a database, such as Internet 112. Storage steps 1000 stores with priorities all URLs whose associated web pages are to be searched by web crawler 284. Step 910 removes from storage device 1000a an URL with the highest priority. After removal of the highest priority URL, the web crawler 284 finds the highest priority URL in the Internet 112 and searches for a web page associated with the highest priority URL. If the web crawler 284 in step 920 determines that there is no web page associated with the highest priority URL, then the second highest priority URL is removed from storage device 1000a and the web crawler 284 repeats the determining step 920 for the second highest priority URL; that is, the web crawler 284 finds the second highest priority URL in the Internet 112 and searches for a web page associated with the second highest priority URL. If the web crawler 284 in step 920 determines that there is no web page associated with the second highest priority URL, the procedure is repeated for a third highest priority URL in storage device 1000a, and so forth. Alternatively, the web crawler 284 in step 920 determines if there are any more URLs in storage device 1000a to be searched. In other words, is storage device 1000a empty of URLs to be searched?

Once it is determined in determining step 920 that a web site or web page 930 is associated with any particular URL, the web page 930 is copied and downloaded by step 940 into web crawler 284. After downloading by step 940, all features or elements of the web site or web page 930 are analyzed in analyzing step 950 in accordance with crawler Rules 406 for determining objects in the downloaded web site or web page 930. An element of a web site or web page 930 is any hypertext mark-up language (HTML) element by definition. HTML is the standard procedure for writing a web site. Stated alternatively, web crawler 284 analyzes the downloaded web site or web page 930 associated therewith for objects. Step 960 determines if any hyperlinks are discovered for any element; and, if so, the hyperlinks are stored by storage step 1000 (e.g., in storage device 1000a). Stated alternatively further, the web crawler 284 determines from its associated downloaded web page 930 if any of the elements contained therein include hyperlinks associated therewith; and, if so, the hyperlinks are transferred or downloaded to the storing step 1000 (e.g., downloaded into storage device 1000a). Hyperlinks effectively execute a "Go To" address wherein the address is the URL associated with the hyperlink. If no hyperlinks are discovered in any particular element by determining step 960, then determining step 970 determines if the particular element in the downloaded web site or web page 930 includes an object. If one or more objects are found in the particular element being tested, then the object(s) are transferred to object storage device 248. The URL associated with the object discovered in the particular element is transferred (e.g., is transferred by web crawler 284) to data storage device 260. Subsequently, determining step 980 determines if any more elements remain in the downloaded web site or web page 930. Stated alternatively, the web crawler 284 determines if the last element in the downloaded web page 930 has been tested by determining steps 960 and 970. If more elements remain, then the next-in-line element is received and determining steps 960 and 970 are performed on the next-in-line element. If the last element of the downloaded web page 930 has been addressed by determining steps 960 and 970, then the method 900 is repeated for the next highest priority URL from the storage step 1000 (i.e., from storage device 1000a).

Figure 10:
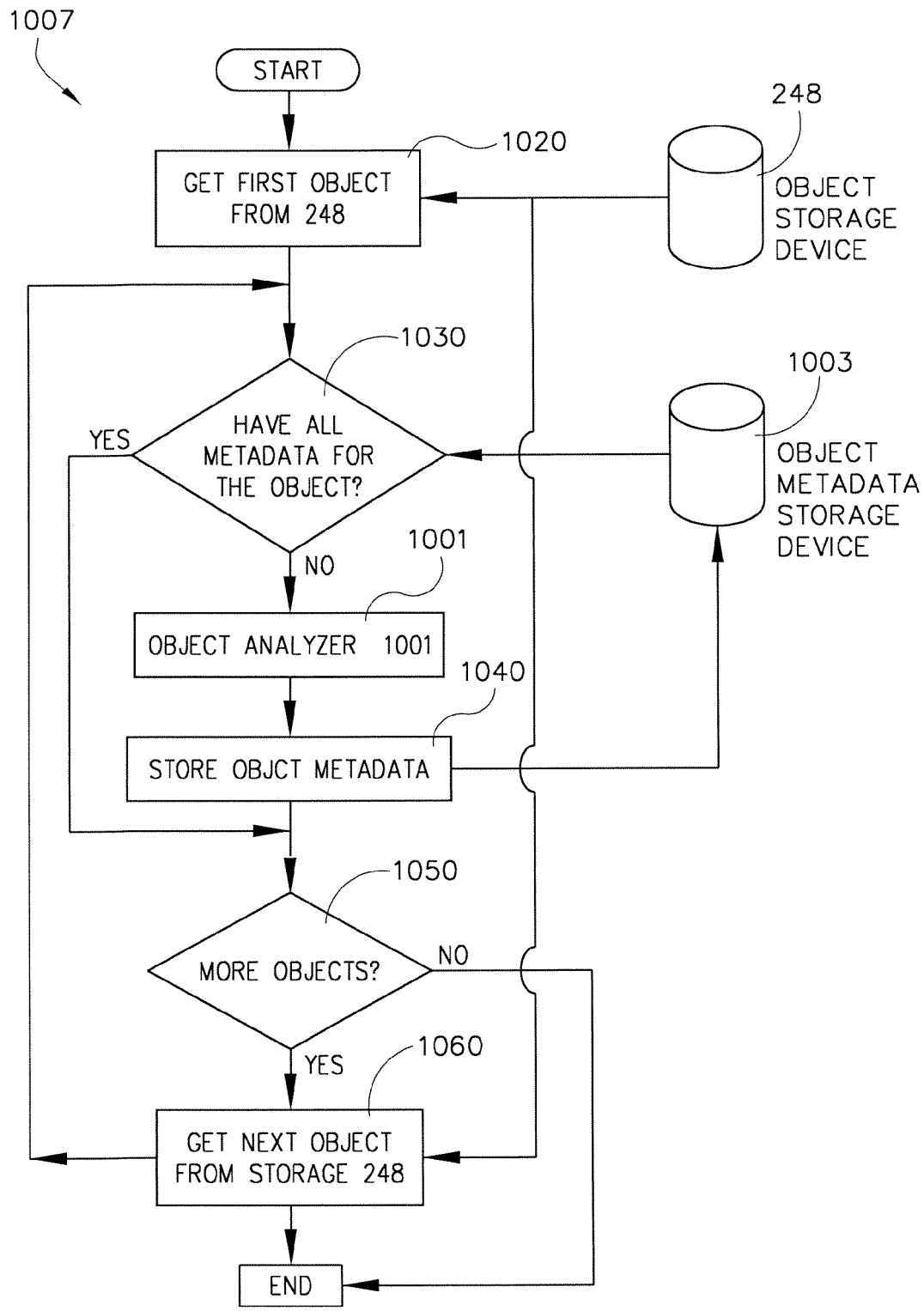
FIG. 10 is a flowchart in accordance with an embodiment of the invention broadly illustrating a method for broadly analyzing objects stored after being duplicated from a database, such as the Worldwide Internet.

Referring now to FIG. 10, there is seen a flowchart for broadly illustrating a method 1007 for broadly analyzing objects stored after being duplicated from a database, such as the Internet 112. In step 1020, the first object to be analyzed for similarity with a known object is removed from the object storage device 248. After removal, a determination is made by determining step 1030 if all of the necessary metadata (i.e., description information data that describes the object which is preferably a matrix of numbers, with numbers representing a pixel in any stored object) is available for the object. The metadata or a matrix of numbers generated from pixels for any particular stored object is in metadata storage device 1003. Determining step 1030 (i.e., using a database query device) searches metadata storage device 1003 for metadata for any particular object. If the necessary metadata for the particular object is not available, then the object is analyzed in step 1001 to develop the necessary metadata. Preferably, object analyzer 1001 develops the necessary metadata by receiving the particular object as input and analyzing that particular object for content (i.e., for metadata content). When the object is a video, each frame of the video will be analyzed for metacontent. Thus, videos are handled as multiple images. After step 1001 and the development of the necessary metadata, a storing step 1040 stores the developed metadata. Preferably the developed metadata is stored in metadata storage device 1003. Subsequently, the next object is removed by step 1050 from object storage device 248 and the entire procedure is repeated for the next object. If determining step 1030 determines that sufficient metadata exists for any particular object, then steps 1001 and 1040 are bypassed and the next step is step 1050 which is to determine if more objects exist for analyzing. More specifically, a determination is made in step 1050 if object storage device 248 contains more objects which are to be tested to determine if the necessary metadata is available for the particular object. If more objects are available to by analyzed, then step 1060 retrieves the next object from storage device 248 and steps 1030, 1001, 1040 and 1050 are repeated for the next object until determining step 1050 determines that no more objects exist or are available for analysis.

Figure 11:
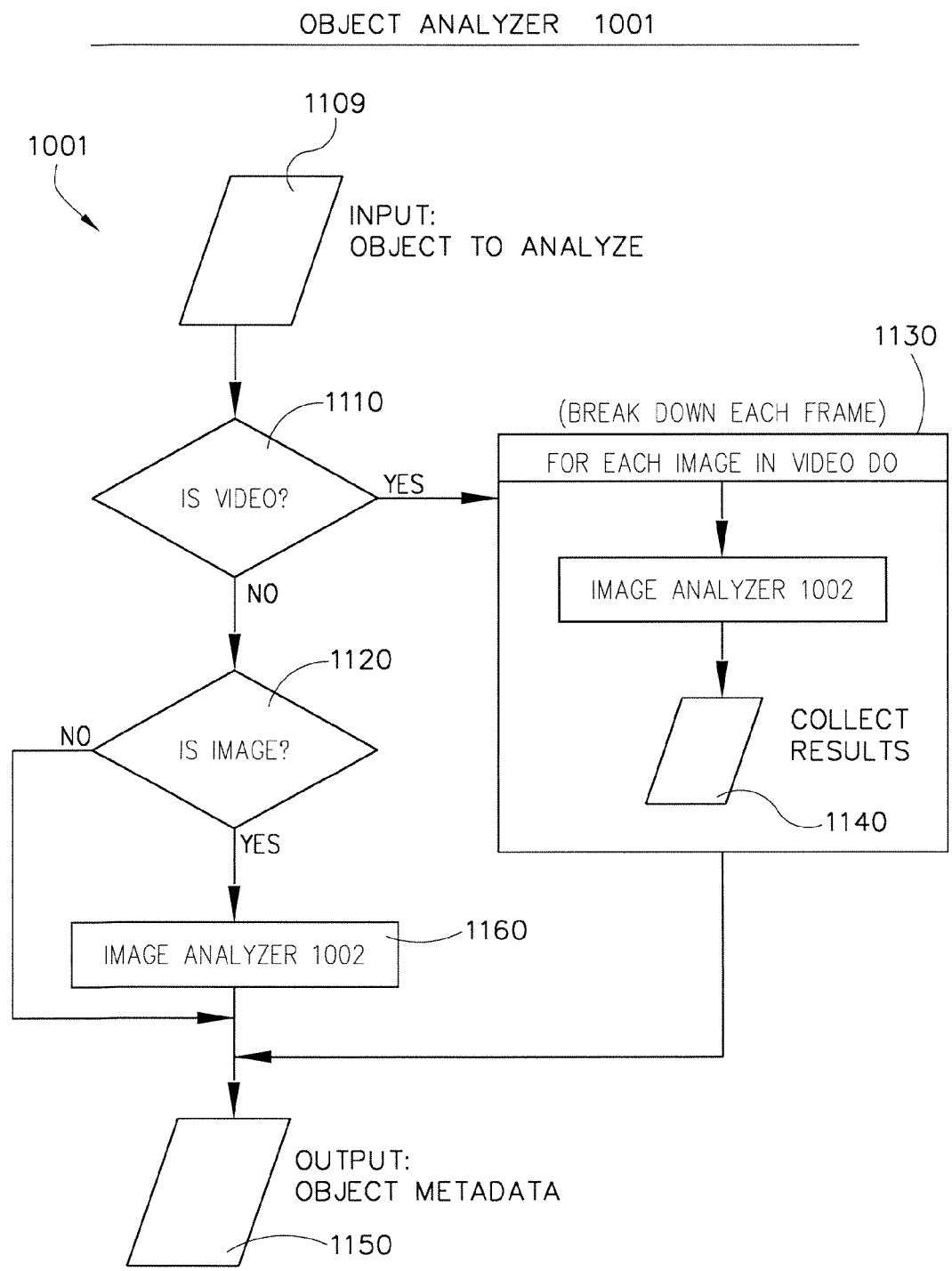
FIG. 11 is a flowchart in accordance with an embodiment of the invention for illustrating a method for more specifically analyzing the stored objects from FIG. 10.

Referring now to FIG. 11 there is seen a flowchart for broadly illustrating the method step 1001 for developing the necessary metadata for any particular object. Object 1109 to be analyzed is input, or otherwise provided, for determining in determining step 1110 if the object 1109 is a video. If object 1109 is not a video then the object 1109 is investigated in determining step 1120 to determine if the object 1109 is an image (e.g., both the texts or words and logos or designs of marks). If the object 1109 is a video then step 1130 analyzes each frame of the video. For each frame in the video, step 1130 employs image analyzer 1002 for analysis and recognition operations on each frame. The results of performing an image analysis and an image recognition operation on each frame of an object video is collected by step 1140 and is transferred in the form of metadata to output step 1150 for storage in step 1040 (see FIG. 10).

The image analyzer 1002 is employed in step 1130 for analyzing each frame of a video after determining step 1110 determines that the object is a video, or the image analyzer 1002 is employed in step 1160 (i.e., the image analyzing step 1160) after step 1120 determines that the object itself is an image, e.g., the combination of designs or logos and texts or words in a mark, or the combination of two or more of the following in a mark: texts, logos, facial features, watermarks, signature features, and similarity features. The image analyzer 1002 for embodiments of the present invention performs one or more of the following analyses: OCR (optical character recognition) analysis which recognizes text (e.g., one or more words) in the image; face analysis which detects human or animal faces by employing templates stored in a storage step (identified below as "1005"); watermarks analysis which detects and reads embedded watermarks; signature analysis which produces a "digital fingerprint" of the image by calculating one or more numbers, and is employed to identify similar images that have similar "digital fingerprints;" and image similarity analysis which computes one or more numbers that describe the visual similarity of the image to or vis-à-vis images stored in a storing step (identified below as "1006"). Each calculated number for signature analysis and for image similarity analysis represents an algorithmic output from a respective algorithm. The more algorithms employed in the signature analysis and in the image similarity analysis, the more algorithmic outputs are produced; and the more algorithmic outputs produced, the more accurate the respective analysis is. The algorithms adjust for size and orientation (e.g., vertical or horizontal) of the object or image. As shown in FIG. 11, the results computed by and/or obtained by the image analyzing step 1160 (e.g., the image analyzer 1002), along with the results collected by collecting step 1140 of step 1130 are transferred to storing step 1150 were object metadata is stored.

Figure 12:
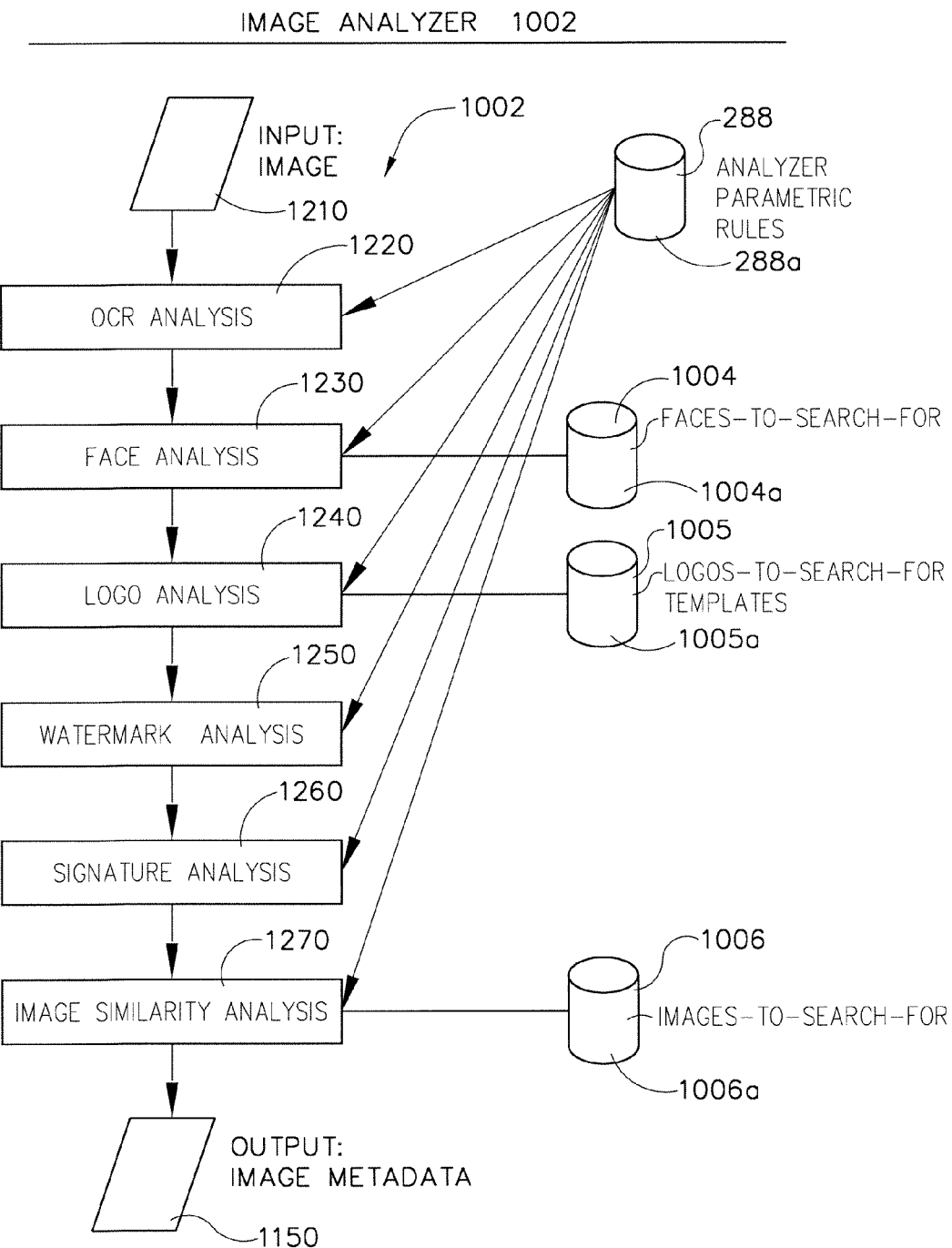
FIG. 12 is a flowchart in accordance with an embodiment of the invention for illustrating a method for analyzing an image after the stored object has been determined to be an image in accordance with the method schematically illustrated in FIG. 11.

Referring now to FIG. 12, there is seen a flow chart in accordance with an embodiment of the invention for illustrating method 1002 for analyzing an image after step 1120 determines that the object is an image, or for analyzing an image in any frame of a video in accordance with step 1130. Input step 1210 inputs the image to commence one or more of the following analyzing steps: OCR analyzing step 1220, face analyzing step 1230, logo analyzing step 1240, watermarks analyzing step 1250, signature analyzing step 1260, and image similarity analyzing step 1270. Analyzer parametric Rules 288 are stored (e.g., storage device 288*a* stores analyzer parametric Rules 288). Rules 288 enable the production of image metadata by communicating with and transferring to steps 1220, 1230, 1240, 1250, 1260, and 1270 algorithms and/or other parameters which the steps may employ to assist in producing image metadata. OCR analyzing step 1220 receives the pertinent algorithms from analyzer parametric Rules 288 for producing a plurality of numbers (i.e., OCR algorithmic outputs). For example, one algorithm received from analyzer parametric Rules 288 may be "Caere OCR" which may be purchased commercially from Caere Corporation of Los Gatos, Calif. As previously indicated, the analyzing steps employ algorithms which adjust for size and orientation of objects or images.

After the OCR analyzing step 1220 has been performed on an image, the face analyzing step 1230 is conducted on the image by receiving the relevant algorithms from analyzer parametric Rules 288 to enable step 1230 is produce the algorithmic outputs (i.e., numbers) for describing any face. For example, one algorithm received from analyzer parametric Rules 288 for analyzing a face may be "Face-It" which may be purchased commercially from Caere Corporation of Los Gatos, Calif. The more algorithms employed to produce numbers for describing a face, the more accurate the face analysis step 1230 will be. Facial templates (e.g., faces to be searched for on Internet 112) are stored at storing step 1004 (e.g., in storage device 1004*a*). After the face analysis step 1230 has been conducted on an image, the logo analysis step 1240 is conducted on the image. Logo templates (e.g., logos to be searched for on the Internet 112) are stored at storing step 1005 (e.g., in storage device 1005*a*). Logo analysis step 1240 analyses any logos (e.g. design(s) or symbol(s) in a mark) within the image versus the logo templates in storage device 1005*a*. A logo template from storage device 1005*a* is superimposed over any logo in the image and is similarly produced by template matching.

A watermark analysis may subsequently be conducted on the image by the watermarks analysis step 1250 which receives the relevant algorithms and other parameters from analyzer parametric Rules 288 for detecting and reading embedded watermarks in the image. For example, an algorithm used in the watermarks analysis step 1250 is Digimark Watermarking which is commercially available from Digimark Corporation of Portland Oreg.

After the watermarks analysis step 1250 has been conducted on the image to recognize and analyze the image for watermarks, a signature analysis step 1260 and an image similarity analysis step 1270 is performed on the image. The signature analysis step 1260 receives the pertinent and relevant algorithms from the analyzer parametric Rules 288 and inputs into the algorithms detected variables, such as "color count" and "color distribution" to calculate one or more numbers to produce a "digital fingerprint" which are employed to identify images (i.e., known similar images) that have similar "digital fingerprints." The image similarity analysis step 1270 receives the pertinent, relevant algorithms for computing one or more numbers (e.g., algorithmic output(s) such as "Color-Histogram-Matching") that describe the visual similarity if any to images in storing step 1006.

Figure 13:
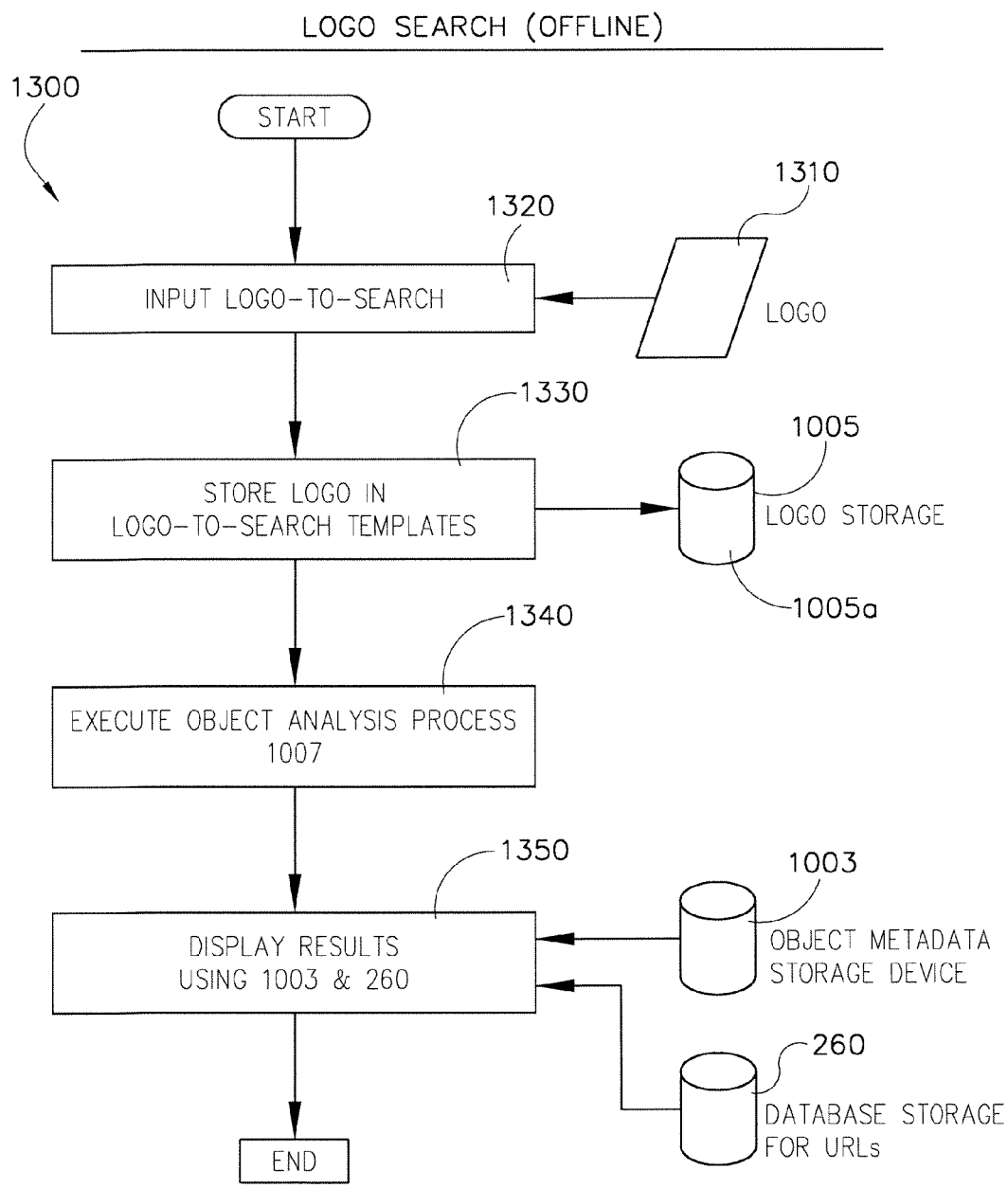
FIG. 13 is a flowchart in accordance with an embodiment of the invention for illustrating a method for analyzing and determining similarity of a known logo with one or more stored logos duplicated from a database, such as the Worldwide Internet.

Referring now to FIG. 13, there is seen a flowchart in accordance with an embodiment of the invention for illustrating a method 1300 for analyzing and determining similarity of a known logo 1310 with one or more stored logos which are stored in object storage device 248 after being duplicated from a database, such as the Internet 112. Step 1320 receives known logo 1310 as input logo-to-search. Stated alternatively, a determination is to be made if known logo 1310 is being used on the Internet 112; more specifically, if the Internet 112 contains a logo (which could exist in storage device 1005*a*) that is confusingly similar to the known logo 1310. From input step 1320, logo 1310 is duplicated and stored by step 1330 in storing step 1005 (i.e., logo storage device 1005*a*). After duplicating and storing logo 1310 by step 1330, step 1340 executes method 1007 of FIG. 10 (i.e., the object analyzing process 1007) to determine if any logos stored in object storage device 248 are confusingly similar to the known logo 1310. Step 1340 uses the object analyzer 1001 to analyze all objects stored in object storage device 248. Method step 1340 may be distributed on hundreds of parallel computers. After step 1340 has executed object analysis process 1007, step 1350 displays the results, along with displaying for the similar logos the corresponding metadata and URL from storage device 1003 and database storage 260 for URLs, respectively.

Figure 14:
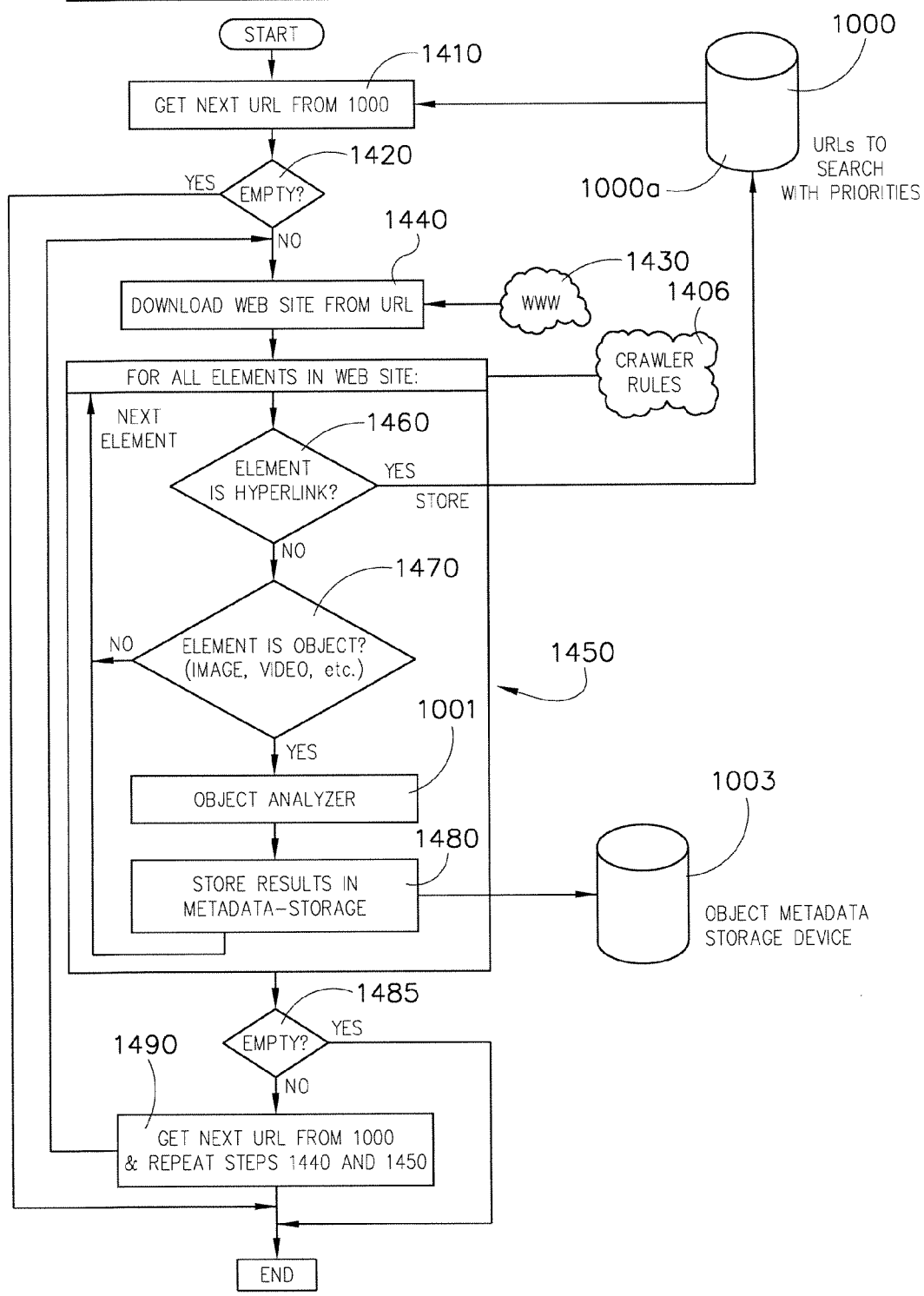
FIG. 14 is a flowchart in accordance with another embodiment of the invention broadly illustrating a method for online sweeping or canvassing a database for online detecting, analyzing, duplicating, and storing objects.

Referring now to FIG. 14, there is seen a flow chart for broadly illustrating a method 1400 for online sweeping or canvassing a database, such as internet 112, for online detecting, analyzing, duplicating, and storing objects. For this embodiment of the invention, the web crawler 284 includes its own object analyzer. Storage step 1000 stores with priorities all URLs whose associated web pages are to be searched by web crawler 284. Step 1410 removes from storage 1000*a* an URL with the highest priority. After removal of the highest priority URL, the web crawler 284 finds the highest priority URL in the Internet 112 and searches for a web page associated with the highest priority URL. If the web crawler 284 in step 1420 determines that there is no web page associated with the highest priority URL, then the second highest priority URL is removed from storage 1000*a* and the web crawler 284 repeats the determining step 1420 for the second highest priority URL; that is, the web crawler 284 finds the second highest priority URL in the Internet 112 and searches for a web page associated with the second highest priority URL. If the web crawler 284 in step 1420 determines that there is no web page associated with the second highest priority URL, the procedure is repeated for a third highest priority URL in storage 1000*a*.

Once it is determined in determining step 1420 that a web site or web page 1430 is associated with any particular URL, the web page 1430 is copied and downloaded by step 1440 into web crawler 284. After downloading by step 1440, all features or elements of the web site or web page 1430 are analyzed in analyzing step 1450 in accordance with crawler Rules 406 for determining objects in the downloaded web site or web page 1430. As previously indicated, an element of a web site or web page 1430 is a defined HTML element. Stated alternatively, the web crawler 284 includes its own object analyzer for performing analyzes of the downloaded web site or web page 1430 for objects associated therewith. Step 1460 of step 1450 determines if any hyperlinks are discovered for any element, and if so, the hyperlinks are stored by storage step 1000 (e.g., in storage device 1000*a*). Stated alternatively, step 1460 of step 1450 of the web crawler 284 determines from associated downloaded web page 930 if any of the elements contained therein include hyperlinks associated therewith; and if so, the hyperlinks are transferred or downloaded to the storing step 1000 (e.g., downloaded into storage device 1000*a*). As previously indicated, hyperlinks effectively execute a "Go To" address wherein the address is the URL associated with the hyperlinks. If no hyperlinks are discovered in any particular element by determining step 1460, then determining step 1470 determines if the particular element in the downloaded web site or web page 1430 includes an object (e.g., an image, an audio, or video). If one or more objects are found in the particular element being tested, then step 1001 (i.e., method 1001 of FIG. 11) is executed for the one or more objects. Step 1480 transfers and/or causes the results to be stored in object metadata storage device 1003. Subsequently, step 1485 determines if any more URLs exist in storage step 1000 (i.e., storage device 1000*a*) having a second highest priority. Stated alternatively, step 1485 tests to determine if storage device 1000*a* is empty (i.e., have all URLs been removed for analyzing their associated web pages for objects?). If more URLs exist in storage device 1000*a*, then step 1490 retrieves the next highest priority URL from storage device 1000*a* and steps 1440 and 1450 are repeated for the next highest priority URL from the storing step 1000 (i.e., from storage device 1000*a*).

Figure 15:
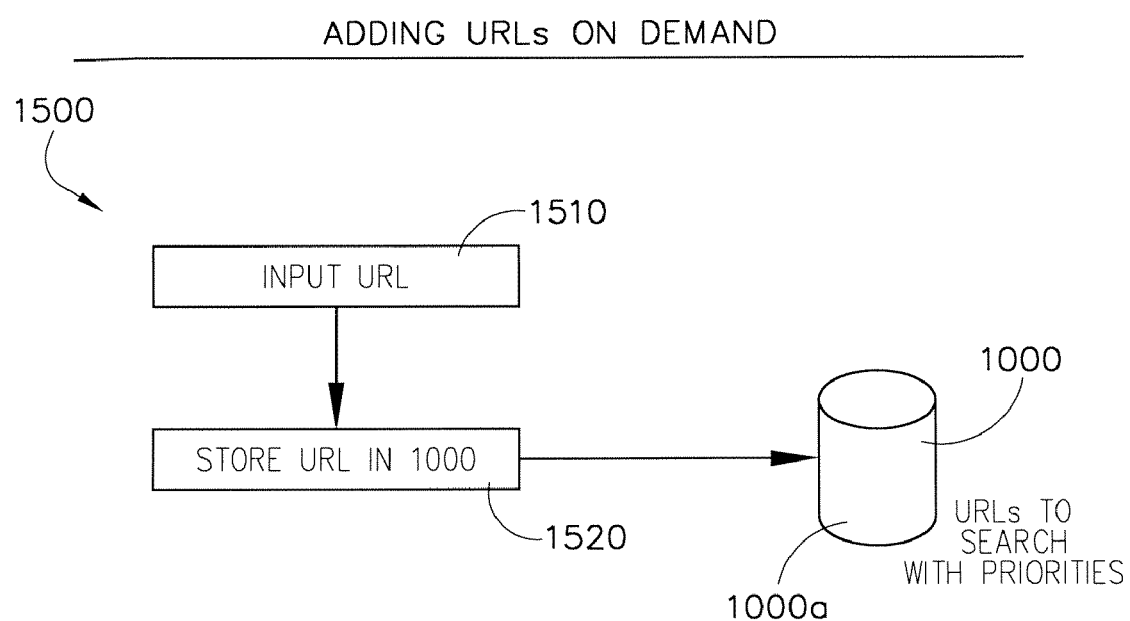
FIG. 15 is a flowchart broadly illustrating a method for adding and storing URLs which are to be searched in a database.

Referring now to FIG. 15, there is seen a flow chart for broadly illustrating a method 1500 for adding and storing URLs which are to be searched on the Internet 112. A new URL is received as input in step 1510, and then step 1520 transfers and/or otherwise causes the new URL to be stored in the storing step 1000 (i.e., in storage device 1000*a*). The first new URL being stored in storage device 1000*a* has the highest priority, followed by the second new URL which has the next highest priority, and so forth.

Figure 16:
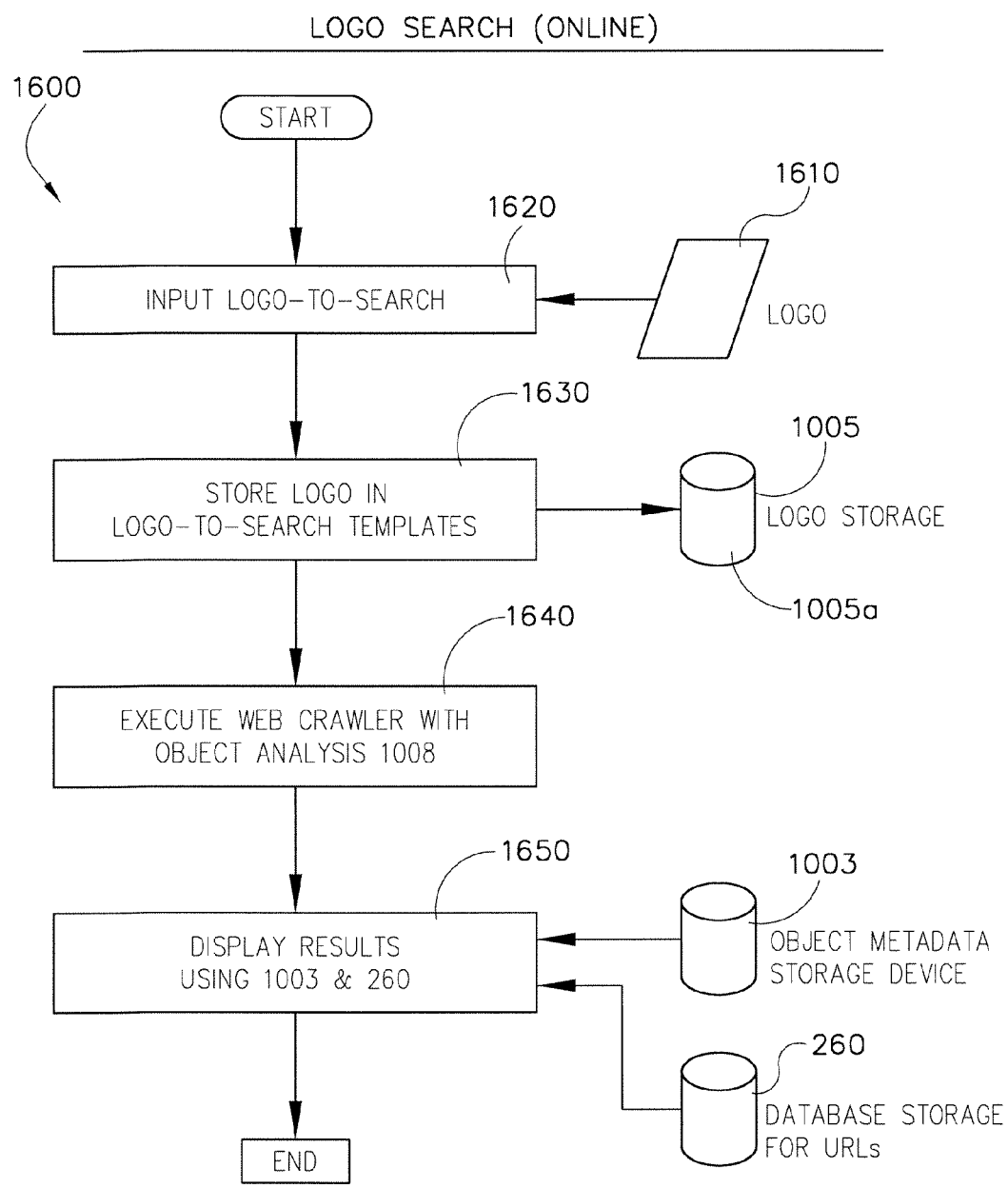
FIG. 16 is a flowchart in accordance with another embodiment of the invention for illustrating a method for online analyzing and determining similarity of a known logo with any logo detected and analyzed in a database, such as the Worldwide Internet.

In FIG. 16 there is seen a flow chart in accordance with another embodiment of the invention for illustrating a method 1600 for online analyzing and determining similarity of a known logo with any logo detected in and analyzed from the Internet 112. For this embodiment of the invention, the web crawler 284 itself possesses the capabilities of doing its own object analysis by having its own object analyzer (i.e., object analyzer 1008). Step 1620 receives known logo 1610 as input logo-to-search. Stated alternatively, a determination is to be made if known logo 1610 is being used on the Internet 112; more specifically, if the Internet 112 contains a logo (which could exist in storage device 1005*a*) that is confusingly similar to the known logo 1610. From input step 1620, logo 1610 is duplicated and stored by step 1630 in storing step 1005 (i.e., logo storage device 1005*a*). After duplicating and storing logo 1610 by step 1630, step 1640 executes method 1008 of FIG. 14 (i.e., web crawler 284 with the object analyzing process 1008) to determine if any logos on the Internet 112 are confusingly similar to the known logo 1620. Step 1640 uses the object analyzer 1001 to analyze all objects discovered on the Internet 112 by the web crawler 284. Method step 1640 may be distributed on hundreds of parallel computers. After step 1640 has executed object analysis process 1008, step 1560 displays the results, along with displaying for the similar logos the corresponding metadata and URL from storage device 1003 and database storage 260 for URLs, respectively.

The invention will now be illustrated by the following set forth examples which are being given by way of illustration only and not by way of any limitation. All parameters such as, source code, model templates and ID numbers, etc., submitted in these examples are not to be construed to unduly limit the scope of the invention.

EXAMPLE I

Web crawler 284 was activated to scan the Internet 112 and sweep servers 108, to search for web objects including images, by automatically following hyperlinks contained in web site elements 113. The web crawler 284 received an URL from storage device 100*a*. The received URL pointed to a web site with the following content which was written in typical HTML language:

```
<html>
<head>
<title>Demonstration</title>
<body>
<p> Demonstration </p>
</div>
<img width=300 height=250 src="./tshirt.jpb"></p>
</div>
<a href="http://www.cobion.com">http://www.cobion.com</a>
</body>
</html>
```

Figure 17:
FIG. 17 is a pictorial of an image-object for Example I that was duplicated from the Internet and stored in the object storage device.

The foregoing web site contained two important elements. The first important element was an image (i.e., both the word(s) and the design(s)/logo(s) in a mark) defined by <img . . . >. The URL of this image was stored in data storage device 260. The following information on the image was stored in the object storage device 248:
  a unique image id, for example "970729" (see FIG. 17)
  width and height of the image, where width was equal to 300 pixels and height was equal to 250 pixels
  current date, for example 12/01/00
  image-name, for example "tshirt.jpg"

The second important element in the web site was a hyperlink defined by "<a href= . . . >." This hyperlink pointed to the web site "http://www.cobion.com" and was stored in storage device 1000. The stored information associated with this hyperlink was available for use to determine if the stored information including the image was confusingly similar with a known object.

EXAMPLE II

A search for the "adidas" logo or design (i.e., the known object) was conducted for all objects including images (i.e., both text or words and designs in a mark) contained in the object storage device 248. The system received the "adidas" logo using the source code ( . . . . ). For later identification and reference, the system created unique identifier "10001" (see FIG. 18) for the entered "adidas" logo and stored the "adidas" logo in storage device 1005*a*. Subsequently, object analysis method 1007 (see FIG. 10) was executed for analyzing the content of objects in object storage device 248. A matrix of numbers were produced for each object from pixels in each object. Each pixel consists of three (3) numbers representing the colors red, green, and blue. The matrix of numbers were created or computed in RAM 270 when the object(s) were loaded from storage.

The actual analysis for any logo or design in the image of Example I with the "id 970729" took place in object analyzer 1001. Because the image with "id 970729" was determined to be an image by object analyzer 1001, image analyzer method 1002 (see FIG. 12) was executed immediately. In method 1002 the logo or design analysis worked in the following manner:

At the beginning the image with "id 970729" was loaded into the RAM 270 (see FIG. 1) of the computer system 104. RAM 270 created for image with "id 970729" a matrix of numbers comprising:

```
 91 118 109 121 132 145 114 124 115 154 187 207 205 220 246 249 252 250 252  25 252 253 253 253 244 236 241 236 242 250 252
106 126 158 157 129 131 184 210 226 242 243 247 245 247 248 250 246 246 250 250 246 252 251 249 247 234 233 222 241 248 246
156 203 232 231 230 231 241 242 241 248 253 246 245 244 245 248 223 242 243 235 239 244 232 239 234 222 212 195 236 236 227
175 214 233 228 229 231 243 243 240 237 233 231 234 226 226 216 213 206 147 167  79  73 167 197 196 180 187 194 172
167 197 212 221 217 225 224 221 216 215 218 205 215 207 216 204 111  68  44  40  26  34  80 195 186 177 167 180 169 175
136 169 198 192 200 199 208 216 206 211 200 196 214 202 204 160 103 131  40  45  34  34  42 170 182 167 163 158 153 158
121 166 187 197 205 195 209 222 210 208 213 193 207 191  84  60  44  60  37  23  34  34  36 148 178 174 159 155 161 158
121 173 181 216 210 205 201 199 202 195 198 202  89  31  85  52  64  89 137  62 114  24  29  80 148 170 151 147 139 136 163
129 182 197 202 214 218 205 203 188 190 185 187 143  34 130 122 170  34  34  34  27  34  34  43 102 167 136 143 130 131 134
157 183 193 194 188 199 186 187 181 183 193 122 143  34  34  38  23  34  34  34  34  34  35  34  57 112  71  88  81 122 127
151 180 210 193 181 192 188 175 185 170 180 149  51  34  34  34  34  34  34  34  34  34  35  28  17  38  34  53  54 123 121
136 180 202 192 183 203 189 192 170 150 115 122  34  34  34  34  34  34  34  34  34  34  35  34  18  34  36  41  47 114 117
131 177 200 193 184 181 182 174  97  64  44  55  34  34  34  34  34  34  34  34  34  34  36  24  17  34  38  78 117  73  87
172 183 194 189 179 168  84  56  31  34  39  38  34  39  24  33  25  30  36  38  85  32  32  36  61  38  78  88  76
153 183 183 171 178 169  71  38  28  36  73  44  34  34  34  25  30  36  38  34  84 108  86 126  84 126 113  63 127 132  98
140 185 162 170 177 171 128  87  80  73 126 127  74  54  62  53  65  25  30  37  96 156  25 111  50  85  55 117 107 100
152 181 170 160 124 103 119 115  78 149  40  30  26  23  32  80  45  65  30  83 138 106  28  27  71 164  48  56  66  39
151 199 170  85  30  14  28  19 140 172 103  80  79  46  39  61  52  46  28  85  34  29  85 129  46  30  24  39
156 156 112  23  69 106  64  17 137  76  83  61  30  23  45  68  48  38  31  30  89  24  31  43  28  51  46  90
148 158 103  13  90 148  83  35  61  39  41  45  32  23  68  52  39  52  75  56  34  86 164  57 167  25  13  47  90  72  51
159 158 129  58  13  51  74  45  97  71  17 150  53  45  76  60  39  31 107  30  56  25  73 225  63  46 180  63  72  57
192 180 172 139  81  48  31  69  97  71  59  23  66  32  41  60  95  95  31  85  81 215  31  43 171 118  81  58
233 223 213 216 211 212 222 204 118 150 159 166 171 191 204 183 198 137 180 156 156 197 198 205 212 203 202 192 175 180 153
218 220 217 221 224 232 225 228 206 208 218 228 216 224 225 198 225 180 229 220 214 215 196 225 203 173 202 175 183
 96  97  95  92  95 109 106 103 105 104 106 103 103 104 102 104  92  88  87  88  86  82  87  82  84  85  81  85  90
```

Subsequently, the computer system 104 executed the content analysis of the image with "id 970729" by source code:

```
Image:=VC_LoadImage24(path);
``` where "path" was the local location where the image with "id 970729" was stored in object storage device 248 (see FIGS. 2 and 3A), which would be "tshirt.jpg" from Example I. "VC_LoadImage" was the function that loaded the image "id 970729" into RAM 270 where a matrix of numbers was produced. After that, image with "id 970729" was compared with all logos contained in the logos-to-search-templates database 1005 (see FIG. 12), including the "adidas" logo with id 10001, by source code:

```
for i := 1 to NumberOfLogos do
begin
    FS_SearchLogo(Image,Logo[i], LogoInfo );
end;
```

The foregoing function "FS_SearchLogo(Image,Logi[i], LogoInfo)" was a computer vision algorithm that searched for the "adidas" logo with id 10001 inside the image with "id 970729" by comparing a mathematical template for the "adidas" logo with id 10001 with the matrix of numbers for image with "id 970729." The computer vision algorithm used for this application was called "Template Matching". The variable "LogoInfo" held the results of the analysis, storing information about the region where the "adidas" logo with id 10001 was found in image with "id 970729", and the similarity of that particular region with the searched "adidas" logo.

The "FS_SearchLogo" function created the mathematical model template automatically when the first search for a logo was executed (on demand). The algorithm used for creating the mathematical model was "Create Template". In this Example II the search was for "adidas" logo with id 10001. The template matching algorithms required a template for the "adidas" logo which was automatically generated from the known "adidas" logo. The Mathematical Model Template for the known "adidas" logo 10001 comprised:

| Threshold 423434 | | | | | | |
|---|---|---|---|---|---|---|
| 0 | 0 | 0 | 0.5 | 1 | 0 | 0 |
| 0 | 0 | 0.5 | 2 | 2 | 0.5 | 0 |
| 0 | 0.5 | 2 | 1.5 | 1.5 | 2 | 0 |
| 0.5 | 2 | 1.5 | 1.5 | 1.5 | 2 | 1 |
| 2 | 1.5 | 1.5 | 1.5 | 1.5 | 1.5 | 2 |
| 2 | 2 | 2 | 2 | 2 | 2 | 2 |
| 0 | 0 | 0 | 0 | 0 | 0 | 0 |

The following source code caused the discovery of the template for the "adidas" logo 10001 within the matrix of numbers representing the image with "id 970729":

```
// process different image resolutions
for (_Step=0;_Step<_Steps;_Step++)
{
    SetCurrentResolution (_Step);
    // try to move template step by step over the
    whole image from top-left to the
bottom-right position
    for (_RegX=_Left;_RegX<_Right;_RegX++)
    {
        for (_RegY=_Top;_RegY<_Bottom;_RegY++)
        {
            // calculate match of template
            double Score = MatchTemplate(10001);
            // test if the match is above the calculated
            threshold from the template
            if (Score > TemplateThreshold)
            {
                // store results
                LogoInfo.Score = Score;
                LogoInfo.Region = (regX, RegY);
                return;
            }
        }
    }
}
```

The decision whether the template was contained in a particular region of the image with "id 970729" was made by using a "score" (i.e., the degree of similarity) that expressed how good the template matched a region of the image. If the score was above a desired threshold represented by "Threshold 423434" (e.g. 60%), the process assumed the "adidas" logo with id 10001 was found. Thus, embodiments of the present invention provide determining the region of the object (e.g., image with "id 970729") where the known object (e.g., "adidas" logo or design with id 10001) is located.

After the "adidas" logo with id 10001 was successfully found, the results, also called metadata, were stored in object metadata storage device 1003 (see FIG. 10) using the following source code function:

```
function StoreResultsAndGetNextImage(
    const ClientPC: WideString;
    var AnalyseMethod, IDImage: UINT;
    AnalyseResults: OleVariant;
    tFileLoad, tAnalyse, tCOMCall: UINT) : WideString;
```

In this Example II, the "adidas" logo with "id 10001" was found in image with "id 970729." The metadata that was stored in object metadata storage device 1003 for this discovery was:

| IMAGE_ID | LOGO_ID | REGION | SCORE |
|---|---|---|---|
| 970729 | 10001 | Left: 166<br>Top: 169<br>Right: 290<br>Bottom: 240 | 94% |

The function for storing the metadata in object metadata device 1003 also retrieved the next image to process from object storage device 248 (see FIG. 10) to begin or repeat the method again.

CONCLUSION

Thus, by the practice of embodiments of the present inventions, there is broadly provided a system and method for deterring and/or detecting Internet abuse of trademarked intellectual property by identifying imposter or look-alike brands, logos/designs, trademarks or service marks, and by identifying unauthorized Internet sales channels. Embodiments of the present inventions also broadly provide speedy data gathering of possible trademark infringement or dilution cases, including providing URL's of suspect sites for tracking or enforcement purposes and showing areas of potential brand erosion in Internet commerce. Embodiments of the present inventions provide a system to search images (e.g., both text or words and designs or logos in marks) in the Worldwide Internet by specifying the visual image content in means of: text contained in any images; logos or designs contained in any images; faces of people contained in any images including face recognition; and two (2) dimensional objects like animals, cars, etc. contained in any images. Embodiments of the present inventions search a database for images which are substantially identical or similar to any known images. Embodiments of the present inventions also enable people to search the Internet for images that have a specified visual content.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope and spirit of the invention as set forth. For example, although the network sites are being described as separate and distinct sites, one skilled in the art will recognize that these sites may be part of an integral site, may each include portions of multiple sites, or may include combinations of single and multiple sites. Furthermore, components of this invention may be implemented using a programmed general purpose digital computer, using application specific integrated circuits, or using a network of interconnected conventional components and circuits. As previously indicated, connections may be wired, wireless, modem, etc. Therefore, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A computer implemented method for searching a computer database for target objects that are similar to a known object comprising:
   determining if a target object in the computer database is similar with the known object by comparing a mathematical template associated with pixels that are based on a full-size of the known object with a matrix of numbers derived from pixels associated with the target object, wherein comparing the mathematical template associated with pixels that are based on the full-size of the known object with a matrix of numbers derived from pixels associated with the target object further comprises moving the mathematical template over the matrix of numbers from a first position to a second position.

2. The method of claim 1, wherein the pixels associated with the target object comprise pixels associated with a scaled version of the entire target object.

3. The method of claim 1, wherein the pixels associated with the target object comprise pixels associated with a portion of the target object.

4. The method of claim 1, wherein the pixels based on the known object comprise pixels associated with a full-size of the known object.

5. The method of claim 1, wherein the full-size of the known object comprises a complete area of pixels of the known object.

6. The method of claim 1, wherein each pixel comprises three numbers representing colors.

7. The method of claim 6, wherein the colors comprise one of red, green, and blue.

8. The method of claim 1, wherein each object comprises one of graphic images, videos, and mixtures thereof.

9. A computer system for searching an Internet for target objects that are similar to a known object comprising:
   a web crawler for searching the Internet for target objects;
   a comparison engine coupled to the web crawler, for determining if a target object is similar with the known object by comparing a mathematical template associated with pixels that are based on a full-size of the known object with a matrix of numbers derived from pixels associated with the target object, wherein the comparison engine moves the mathematical template over the matrix of numbers from a first position to a second position.

10. The system of claim 9, wherein each pixel comprises three numbers representing colors.

11. The system of claim 10, wherein the colors comprise one of red, green, and blue.

12. The system of claim 9, wherein the comparison engine provides a numerical value representing a degree of similarity between the known object and a target object.

13. A computer system for searching a database for target objects that are similar to a known object comprising:
   a web crawler for searching the database for target objects;
   a duplicator coupled to the web crawler for creating copies of the target object;
   a comparison engine coupled to the duplicator, for determining if a copy of a target object is similar with the known object by comparing a mathematical template associated with pixels that are based on a full-size of the known object with a matrix of numbers derived from pixels associated with the copy of the target object, wherein the comparison engine moves the mathematical template over the matrix of numbers from a first position to a second position.

14. The system of claim 13, wherein the first position comprises an upper and left most position of the matrix of numbers.

15. The system of claim 13, wherein the pixels associated with the copy of the target object comprise pixels associated with a full-size of the copy of the target object.

16. The system of claim 13, wherein the pixels associated with the copy of the target object comprise pixels associated with a scaled version of the entire copy of the target object.

* * * * *